United States Patent
King et al.

(10) Patent No.: US 7,990,556 B2
(45) Date of Patent: Aug. 2, 2011

(54) ASSOCIATION OF A PORTABLE SCANNER WITH INPUT/OUTPUT AND STORAGE DEVICES

(75) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 1224 days.

(21) Appl. No.: 11/365,983

(22) Filed: Feb. 28, 2006

(65) Prior Publication Data

US 2006/0256371 A1    Nov. 16, 2006

Related U.S. Application Data

(63) Continuation-in-part of application No. 11/004,637, filed on Dec. 3, 2004, now Pat. No. 7,707,039, and a continuation-in-part of application No. 11/097,961, filed on Apr. 1, 2005, now abandoned, and a continuation-in-part of application No. 11/097,093, filed on Apr. 1, 2005, now abandoned, and a continuation-in-part of application No. 11/098,038, filed on Apr. 1, 2005, now Pat. No. 7,599,844, and a continuation-in-part of application No. 11/098,014, filed on Apr. 1, 2005, and a continuation-in-part of application No. 11/097,103, filed on Apr. 1, 2005, now Pat. No. 7,596,269, and a continuation-in-part of application No. 11/098,043, filed on Apr. 1, 2005, now abandoned, and a continuation-in-part of application No. 11/097,981, filed on Apr. 1, 2005, now Pat. No. 7,606,741, and a continuation-in-part of application No. 11/097,089, filed on Apr. 1, 2005, and a (Continued)

(51) Int. Cl.
  *G06F 3/12* (2006.01)
(52) U.S. Cl. ....... 358/1.15; 358/402; 358/473; 358/474; 709/228
(58) Field of Classification Search ................. 358/1.15, 358/402, 473, 474; 709/228
See application file for complete search history.

(56) References Cited

U.S. PATENT DOCUMENTS 3,899,687 A    8/1975    Jones
(Continued)

FOREIGN PATENT DOCUMENTS

EP    0424803    5/1991
(Continued)

OTHER PUBLICATIONS

Sams teach yourself EJB in 21 days, 2002-2003, Sams Publishing, pp. 1, 2, 123, 135.*

(Continued)

*Primary Examiner* — Chan S Park
*Assistant Examiner* — Kenneth Kwan
(74) *Attorney, Agent, or Firm* — McDonnell Boehnen Hulbert & Berghoff LLP

(57) ABSTRACT

A device identifier is scanned with a portable scanner and communicated to a service provider. The service provider associates the device with the portable scanner. Information is scanned from a printed source and communicated to the service provider and subsequent information is received in response at a device identified by the device identifier. In some embodiments, a communication session identifier is scanned with a portable scanner and communicated to the service provider rather than (or in cooperation with) the device identifier.

32 Claims, 3 Drawing Sheets

Related U.S. Application Data

(63) continuation-in-part of application No. 11/097,835, filed on Apr. 1, 2005, now Pat. No. 7,831,912, and a continuation-in-part of application No. 11/098,016, filed on Apr. 1, 2005, now Pat. No. 7,421,155, and a continuation-in-part of application No. 11/097,828, filed on Apr. 1, 2005, now Pat. No. 7,742,953, and a continuation-in-part of application No. 11/097,833, filed on Apr. 1, 2005, and a continuation-in-part of application No. 11/097,836, filed on Apr. 1, 2005, now abandoned, and a continuation-in-part of application No. 11/098,042, filed on Apr. 1, 2005, now Pat. No. 7,593,605, and a continuation-in-part of application No. 11/096,704, filed on Apr. 1, 2005, now Pat. No. 7,599,580, and a continuation-in-part of application No. 11/110,353, filed on Apr. 19, 2005, now Pat. No. 7,702,624, and a continuation-in-part of application No. 11/131,945, filed on May 17, 2005, now Pat. No. 7,818,215, and a continuation-in-part of application No. 11/185,908, filed on Jul. 19, 2005, now abandoned, and a continuation-in-part of application No. 11/208,408, filed on Aug. 18, 2005, now abandoned, and a continuation-in-part of application No. 11/208,457, filed on Aug. 18, 2005, now abandoned, and a continuation-in-part of application No. 11/208,458, filed on Aug. 18, 2005, now Pat. No. 7,437,023, and a continuation-in-part of application No. 11/208,461, filed on Aug. 18, 2005, and a continuation-in-part of application No. 11/209,333, filed on Aug. 23, 2005, now abandoned, and a continuation-in-part of application No. 11/210,260, filed on Aug. 23, 2005, now Pat. No. 7,706,611, and a continuation-in-part of application No. 11/236,440, filed on Sep. 27, 2005, now abandoned, and a continuation-in-part of application No. 11/236,330, filed on Sep. 27, 2005, now Pat. No. 7,812,860, and a continuation-in-part of application No. PCT/US2005/011533, filed on Apr. 1, 2005, and a continuation-in-part of application No. PCT/US2005/013586, filed on Apr. 6, 2005, and a continuation-in-part of application No. PCT/US2005/012510, filed on Apr. 12, 2005.

(60) Provisional application No. 60/657,309, filed on Feb. 28, 2005.

(56) References Cited

U.S. PATENT DOCUMENTS

| | | | |
|---|---|---|---|
| 4,052,058 A | 10/1977 | Hintz | |
| 4,526,078 A | 7/1985 | Chadabe | |
| 4,538,072 A | 8/1985 | Immler et al. | |
| 4,610,025 A | 9/1986 | Blum et al. | |
| 4,633,507 A | 12/1986 | Cannistra et al. | |
| 4,636,848 A | 1/1987 | Yamamoto et al. | |
| 4,713,008 A | 12/1987 | Stocker et al. | |
| 4,716,804 A | 1/1988 | Chadabe | |
| 4,748,678 A | 5/1988 | Takeda et al. | |
| 4,776,464 A | 10/1988 | Miller et al. | |
| 4,804,949 A | 2/1989 | Faulkerson | |
| 4,805,099 A | 2/1989 | Huber | |
| 4,829,453 A | 5/1989 | Katsuta et al. | |
| 4,829,872 A | 5/1989 | Topic et al. | |
| 4,890,230 A | 12/1989 | Tanoshima et al. | |
| D306,162 S | 2/1990 | Faulkerson et al. | |
| 4,901,364 A | 2/1990 | Faulkerson et al. | |
| 4,914,709 A | 4/1990 | Rudak | |
| 4,941,125 A | 7/1990 | Boyne | |
| 4,947,261 A | 8/1990 | Ishikawa et al. | |
| 4,949,391 A | 8/1990 | Faulkerson et al. | |
| 4,968,877 A | 11/1990 | McAvinney et al. | |
| 4,985,863 A | 1/1991 | Fujisawa et al. | |
| 4,988,981 A | 1/1991 | Zimmerman et al. | |
| 5,010,500 A | 4/1991 | Makkuni et al. | |
| 5,012,349 A | 4/1991 | de Fay et al. | |
| 5,062,143 A | 10/1991 | Schmitt | |
| 5,083,218 A | 1/1992 | Takasu et al. | |
| 5,093,873 A | 3/1992 | Takahashi et al. | |
| 5,107,256 A * | 4/1992 | Ueno et al. | 340/825.52 |
| 5,109,439 A | 4/1992 | Froessl | |
| 5,119,081 A | 6/1992 | Ikehira et al. | |
| 5,133,024 A | 7/1992 | Froessl et al. | |
| 5,133,052 A | 7/1992 | Bier et al. | |
| 5,136,687 A | 8/1992 | Edelman et al. | |
| 5,142,161 A * | 8/1992 | Brackmann | 250/566 |
| 5,146,404 A | 9/1992 | Calloway et al. | |
| 5,146,552 A | 9/1992 | Cassorla et al. | |
| 5,157,384 A | 10/1992 | Greanias et al. | |
| 5,159,668 A | 10/1992 | Kaasila | |
| 5,168,147 A | 12/1992 | Bloomberg | |
| 5,168,565 A | 12/1992 | Morita et al. | |
| 5,179,652 A | 1/1993 | Rozmanith et al. | |
| 5,185,857 A | 2/1993 | Rozmanith et al. | |
| 5,202,985 A | 4/1993 | Goyal | |
| 5,203,704 A | 4/1993 | McCloud | |
| 5,212,739 A | 5/1993 | Johnson | |
| 5,229,590 A | 7/1993 | Harden et al. | |
| 5,231,698 A | 7/1993 | Forcier | |
| 5,243,149 A | 9/1993 | Comerford et al. | |
| 5,247,285 A | 9/1993 | Yokota et al. | |
| 5,251,106 A | 10/1993 | Hui | |
| 5,251,316 A | 10/1993 | Anick et al. | |
| 5,252,951 A | 10/1993 | Tannenbaum et al. | |
| RE34,476 E | 12/1993 | Norwood | |
| 5,272,324 A * | 12/1993 | Blevins | 235/462.44 |
| 5,288,938 A | 2/1994 | Wheaton | |
| 5,301,243 A | 4/1994 | Olschafskie et al. | |
| 5,347,295 A | 9/1994 | Agulnick et al. | |
| 5,347,306 A | 9/1994 | Nitta | |
| 5,347,477 A | 9/1994 | Lee | |
| 5,355,146 A | 10/1994 | Chiu et al. | |
| 5,360,971 A | 11/1994 | Kaufman et al. | |
| 5,367,453 A | 11/1994 | Capps et al. | |
| 5,371,348 A * | 12/1994 | Kumar et al. | 235/472.02 |
| 5,377,706 A | 1/1995 | Huang | |
| 5,398,310 A | 3/1995 | Tchao et al. | |
| 5,404,442 A | 4/1995 | Foster et al. | |
| 5,404,458 A | 4/1995 | Zetts | |
| 5,418,684 A | 5/1995 | Koenck et al. | |
| 5,418,717 A | 5/1995 | Su et al. | |
| 5,418,951 A | 5/1995 | Damashek | |
| 5,423,554 A | 6/1995 | Davis | |
| 5,430,558 A | 7/1995 | Sohaei et al. | |
| 5,438,630 A | 8/1995 | Chen et al. | |
| 5,452,442 A | 9/1995 | Kephart | |
| 5,454,043 A | 9/1995 | Freeman | |
| 5,462,473 A | 10/1995 | Sheller | |
| 5,465,325 A | 11/1995 | Capps et al. | |
| 5,467,425 A | 11/1995 | Lau et al. | |
| 5,481,278 A | 1/1996 | Shigematsu et al. | |
| 5,485,565 A | 1/1996 | Saund et al. | |
| 5,488,196 A | 1/1996 | Zimmerman et al. | |
| 5,499,108 A | 3/1996 | Cotte et al. | |
| 5,500,937 A | 3/1996 | Thompson-Rohrlich | |
| 5,502,803 A | 3/1996 | Yoshida et al. | |
| 5,512,707 A | 4/1996 | Ohshima | |
| 5,517,578 A | 5/1996 | Altman et al. | |
| 5,532,469 A * | 7/1996 | Shepard et al. | 235/462.27 |
| 5,533,141 A | 7/1996 | Futatsugi et al. | |
| 5,539,427 A | 7/1996 | Bricklin et al. | |
| 5,541,419 A | 7/1996 | Arackellian | |
| 5,543,591 A | 8/1996 | Gillespie et al. | |
| 5,550,930 A | 8/1996 | Berman et al. | |
| 5,555,363 A | 9/1996 | Tou et al. | |
| 5,563,996 A | 10/1996 | Tchao | |
| 5,568,452 A | 10/1996 | Kronenberg | |
| 5,570,113 A | 10/1996 | Zetts | |
| 5,574,804 A | 11/1996 | Olschafskie et al. | |
| 5,581,276 A | 12/1996 | Cipolla et al. | |
| 5,581,670 A | 12/1996 | Bier et al. | |

| | | | | | | |
|---|---|---|---|---|---|---|
| 5,581,681 A | 12/1996 | Tchao et al. | | 5,845,301 A | 12/1998 | Rivette et al. |
| 5,583,542 A | 12/1996 | Capps et al. | | 5,848,187 A | 12/1998 | Bricklin et al. |
| 5,583,543 A | 12/1996 | Takahashi et al. | | 5,852,676 A | 12/1998 | Lazar |
| 5,583,980 A | 12/1996 | Anderson | | 5,861,886 A | 1/1999 | Moran et al. |
| 5,590,219 A | 12/1996 | Gourdol | | 5,862,256 A | 1/1999 | Zetts et al. |
| 5,590,256 A | 12/1996 | Tchao et al. | | 5,862,260 A | 1/1999 | Rhoads |
| 5,592,566 A | 1/1997 | Pagallo et al. | | 5,864,635 A | 1/1999 | Zetts et al. |
| 5,594,469 A | 1/1997 | Freeman et al. | | 5,864,848 A | 1/1999 | Horvitz et al. |
| 5,594,640 A | 1/1997 | Capps et al. | | 5,867,150 A | 2/1999 | Bricklin et al. |
| 5,594,810 A | 1/1997 | Gourdol | | 5,867,597 A | 2/1999 | Peairs et al. |
| 5,595,445 A | 1/1997 | Bobry | | 5,867,795 A | 2/1999 | Novis et al. |
| 5,596,697 A | 1/1997 | Foster et al. | | 5,880,411 A | 3/1999 | Gillespie et al. |
| 5,600,765 A | 2/1997 | Ando et al. | | 5,880,731 A | 3/1999 | Liles et al. |
| 5,602,570 A | 2/1997 | Capps et al. | | 5,880,743 A | 3/1999 | Moran et al. |
| 5,608,778 A | 3/1997 | Partridge, III | | 5,884,267 A | 3/1999 | Goldenthal et al. |
| 5,612,719 A | 3/1997 | Beernink et al. | | 5,889,236 A | 3/1999 | Gillespie et al. |
| 5,625,833 A | 4/1997 | Levine et al. | | 5,889,523 A | 3/1999 | Wilcox et al. |
| 5,627,960 A | 5/1997 | Clifford et al. | | 5,889,896 A | 3/1999 | Meshinsky et al. |
| 5,638,092 A | 6/1997 | Eng et al. | | 5,893,126 A | 4/1999 | Drews et al. |
| 5,649,060 A | 7/1997 | Ellozy et al. | | 5,893,130 A | 4/1999 | Inoue et al. |
| 5,652,849 A | 7/1997 | Conway et al. | | 5,895,470 A | 4/1999 | Pirolli et al. |
| 5,656,804 A | 8/1997 | Barkan et al. | | 5,905,251 A | 5/1999 | Knowles |
| 5,659,638 A | 8/1997 | Bengtson | | 5,907,328 A | 5/1999 | Brush, II et al. |
| 5,663,514 A | 9/1997 | Usa | | 5,917,491 A | 6/1999 | Bauersfeld |
| 5,663,808 A | 9/1997 | Park et al. | | 5,920,477 A | 7/1999 | Hoffberg et al. |
| 5,668,573 A | 9/1997 | Favot et al. | | 5,920,694 A | 7/1999 | Carleton et al. |
| 5,677,710 A | 10/1997 | Thompson-Rohrlich | | 5,932,863 A | 8/1999 | Rathus et al. |
| 5,682,439 A | 10/1997 | Beernink et al. | | 5,933,829 A | 8/1999 | Durst et al. |
| 5,684,873 A | 11/1997 | Tiilikainen | | 5,946,406 A | 8/1999 | Frink et al. |
| 5,684,891 A | 11/1997 | Tanaka et al. | | 5,952,599 A | 9/1999 | Dolby et al. |
| 5,687,254 A | 11/1997 | Poon et al. | | 5,953,541 A | 9/1999 | King et al. |
| 5,692,073 A | 11/1997 | Cass | | 5,956,423 A | 9/1999 | Frink et al. |
| 5,699,441 A | 12/1997 | Sagawa et al. | | 5,960,383 A | 9/1999 | Fleischer |
| 5,701,424 A | 12/1997 | Atkinson | | 5,963,966 A | 10/1999 | Mitchell et al. |
| 5,701,497 A | 12/1997 | Yamauchi et al. | | 5,966,126 A | 10/1999 | Szabo |
| 5,710,831 A | 1/1998 | Beernink et al. | | 5,970,455 A | 10/1999 | Wilcox et al. |
| 5,713,045 A | 1/1998 | Berdahl | | 5,982,853 A | 11/1999 | Liebermann |
| 5,714,698 A | 2/1998 | Tokioka et al. | | 5,982,929 A | 11/1999 | Ilan et al. |
| 5,717,846 A | 2/1998 | Iida et al. | | 5,986,200 A | 11/1999 | Curtin |
| 5,724,521 A | 3/1998 | Dedrick | | 5,986,655 A | 11/1999 | Chiu et al. |
| 5,724,985 A | 3/1998 | Snell et al. | | 5,990,878 A | 11/1999 | Ikeda et al. |
| 5,732,214 A | 3/1998 | Subrahmanyam | | 5,990,893 A | 11/1999 | Numazaki |
| 5,732,227 A | 3/1998 | Kuzunuki et al. | | 5,991,441 A | 11/1999 | Jourjine |
| 5,734,923 A | 3/1998 | Sagawa et al. | | 5,995,643 A | 11/1999 | Saito |
| 5,737,507 A | 4/1998 | Smith | | 5,999,664 A | 12/1999 | Mahoney et al. |
| 5,745,116 A | 4/1998 | Pisutha-Arnond | | 6,002,798 A | 12/1999 | Palmer et al. |
| 5,748,805 A | 5/1998 | Withgott et al. | | 6,002,808 A | 12/1999 | Freeman |
| 5,748,926 A | 5/1998 | Fukuda et al. | | 6,003,775 A | 12/1999 | Ackley |
| 5,752,051 A | 5/1998 | Cohen | | 6,011,905 A | 1/2000 | Huttenlocher et al. |
| 5,754,308 A | 5/1998 | Lopresti et al. | | 6,012,071 A | 1/2000 | Krishna et al. |
| 5,754,939 A | 5/1998 | Herz et al. | | 6,018,342 A | 1/2000 | Bristor |
| 5,756,981 A | 5/1998 | Roustaei et al. | | 6,018,346 A | 1/2000 | Moran et al. |
| 5,764,794 A | 6/1998 | Perlin | | 6,021,218 A | 2/2000 | Capps et al. |
| 5,767,457 A | 6/1998 | Gerpheide et al. | | 6,021,403 A | 2/2000 | Horvitz et al. |
| 5,768,418 A | 6/1998 | Berman et al. | | 6,025,844 A | 2/2000 | Parsons |
| 5,768,607 A | 6/1998 | Drews et al. | | 6,026,388 A | 2/2000 | Liddy et al. |
| 5,774,357 A | 6/1998 | Hoffberg et al. | | 6,028,271 A | 2/2000 | Gillespie et al. |
| 5,774,591 A | 6/1998 | Black et al. | | 6,029,195 A | 2/2000 | Herz |
| 5,777,614 A | 7/1998 | Ando et al. | | 6,031,525 A | 2/2000 | Perlin |
| 5,781,662 A | 7/1998 | Mori et al. | | 6,036,086 A * | 3/2000 | Sizer et al. .................. 235/375 |
| 5,781,723 A | 7/1998 | Yee et al. | | 6,038,342 A | 3/2000 | Bernzott et al. |
| 5,784,061 A | 7/1998 | Moran et al. | | 6,040,840 A | 3/2000 | Koshiba et al. |
| 5,784,504 A | 7/1998 | Anderson et al. | | 6,042,012 A | 3/2000 | Olmstead et al. |
| 5,796,866 A | 8/1998 | Sakurai et al. | | 6,049,034 A | 4/2000 | Cook |
| 5,798,693 A | 8/1998 | Engellenner | | 6,049,327 A | 4/2000 | Walker et al. |
| 5,798,758 A | 8/1998 | Harada et al. | | 6,052,481 A | 4/2000 | Grajski et al. |
| 5,799,219 A | 8/1998 | Moghadam et al. | | 6,053,413 A * | 4/2000 | Swift et al. ............... 235/472.01 |
| 5,805,167 A | 9/1998 | van Cruyningen | | 6,055,513 A | 4/2000 | Katz et al. |
| 5,809,172 A | 9/1998 | Melen | | 6,057,844 A | 5/2000 | Strauss |
| 5,809,267 A | 9/1998 | Moran et al. | | 6,057,845 A | 5/2000 | Dupouy |
| 5,809,476 A | 9/1998 | Ryan | | 6,061,050 A | 5/2000 | Allport et al. |
| 5,818,965 A | 10/1998 | Davies | | 6,064,854 A | 5/2000 | Peters et al. |
| 5,821,925 A | 10/1998 | Carey et al. | | 6,066,794 A | 5/2000 | Longo |
| 5,822,539 A | 10/1998 | van Hoff | | 6,069,622 A | 5/2000 | Kurlander |
| 5,825,943 A | 10/1998 | DeVito et al. | | 6,072,494 A | 6/2000 | Nguyen |
| 5,832,474 A | 11/1998 | Lopresti et al. | | 6,072,502 A | 6/2000 | Gupta |
| 5,837,987 A | 11/1998 | Koenck et al. | | 6,075,895 A | 6/2000 | Qiao et al. |
| 5,838,326 A | 11/1998 | Card et al. | | 6,078,308 A | 6/2000 | Rosenberg et al. |
| 5,838,889 A | 11/1998 | Booker | | 6,081,621 A | 6/2000 | Ackner |

| | | |
|---|---|---|
| 6,081,629 A | 6/2000 | Browning |
| 6,085,162 A | 7/2000 | Cherny |
| 6,088,484 A | 7/2000 | Mead |
| 6,088,731 A | 7/2000 | Kiraly et al. |
| 6,092,038 A | 7/2000 | Kanevsky et al. |
| 6,092,068 A | 7/2000 | Dinkelacker |
| 6,097,392 A | 8/2000 | Leyerle |
| 6,098,106 A | 8/2000 | Philyaw et al. |
| 6,104,401 A | 8/2000 | Parsons |
| 6,104,845 A | 8/2000 | Lipman et al. |
| 6,107,994 A | 8/2000 | Harada et al. |
| 6,108,656 A | 8/2000 | Durst et al. |
| 6,111,580 A | 8/2000 | Kazama et al. |
| 6,111,588 A | 8/2000 | Newell |
| 6,115,053 A | 9/2000 | Perlin |
| 6,115,482 A | 9/2000 | Sears et al. |
| 6,115,724 A | 9/2000 | Booker |
| 6,118,888 A | 9/2000 | Chino et al. |
| 6,118,899 A | 9/2000 | Bloomfield et al. |
| D432,539 S | 10/2000 | Philyaw |
| 6,128,003 A | 10/2000 | Smith et al. |
| 6,134,532 A | 10/2000 | Lazarus et al. |
| 6,138,915 A | 10/2000 | Danielson et al. |
| 6,144,366 A | 11/2000 | Numazaki et al. |
| 6,147,678 A | 11/2000 | Kumar et al. |
| 6,151,208 A | 11/2000 | Bartlett |
| 6,154,222 A | 11/2000 | Haratsch et al. |
| 6,154,723 A | 11/2000 | Cox et al. |
| 6,154,758 A | 11/2000 | Chiang |
| 6,157,935 A | 12/2000 | Tran et al. |
| 6,164,534 A | 12/2000 | Rathus et al. |
| 6,167,369 A | 12/2000 | Schulze |
| 6,169,969 B1 | 1/2001 | Cohen |
| 6,175,772 B1 | 1/2001 | Kamiya et al. |
| 6,175,922 B1 | 1/2001 | Wang |
| 6,178,263 B1 | 1/2001 | Fan et al. |
| 6,181,343 B1 | 1/2001 | Lyons |
| 6,181,778 B1 | 1/2001 | Ohki et al. |
| 6,184,847 B1 | 2/2001 | Fateh et al. |
| 6,192,165 B1 | 2/2001 | Irons |
| 6,192,478 B1 | 2/2001 | Elledge |
| 6,195,104 B1 | 2/2001 | Lyons |
| 6,195,475 B1 | 2/2001 | Beausoleil, Jr. et al. |
| 6,199,048 B1 | 3/2001 | Hudetz et al. |
| 6,204,852 B1 | 3/2001 | Kumar et al. |
| 6,208,355 B1 | 3/2001 | Schuster |
| 6,208,435 B1 | 3/2001 | Zwolinski |
| 6,215,890 B1 | 4/2001 | Matsuo et al. |
| 6,218,964 B1 | 4/2001 | Ellis |
| 6,219,057 B1 | 4/2001 | Carey et al. |
| 6,222,465 B1 | 4/2001 | Kumar et al. |
| 6,226,631 B1 | 5/2001 | Evans |
| 6,229,137 B1 | 5/2001 | Bohn |
| 6,229,542 B1 | 5/2001 | Miller |
| 6,233,591 B1 | 5/2001 | Sherman et al. |
| 6,240,207 B1 | 5/2001 | Shinozuka et al. |
| 6,243,683 B1 | 6/2001 | Peters |
| 6,244,873 B1 | 6/2001 | Hill et al. |
| 6,249,292 B1 | 6/2001 | Christian et al. |
| 6,249,606 B1 | 6/2001 | Kiraly et al. |
| 6,252,598 B1 | 6/2001 | Segen |
| 6,256,400 B1 | 7/2001 | Takata et al. |
| 6,269,187 B1 | 7/2001 | Frink et al. |
| 6,269,188 B1 | 7/2001 | Jamali |
| 6,270,013 B1 | 8/2001 | Lipman et al. |
| 6,285,794 B1 | 9/2001 | Georgiev et al. |
| 6,289,304 B1 | 9/2001 | Grefenstette et al. |
| 6,292,274 B1 | 9/2001 | Bohn |
| 6,304,674 B1 | 10/2001 | Cass et al. |
| 6,307,952 B1 | 10/2001 | Dietz |
| 6,307,955 B1 | 10/2001 | Zank et al. |
| 6,310,971 B1 | 10/2001 | Shiiyama et al. |
| 6,310,988 B1 | 10/2001 | Flores et al. |
| 6,311,152 B1 | 10/2001 | Bai et al. |
| 6,312,175 B1 | 11/2001 | Lum |
| 6,313,853 B1 | 11/2001 | Lamontagne et al. |
| 6,314,406 B1 * | 11/2001 | O'Hagan et al. ........... 705/14.23 |
| 6,314,457 B1 | 11/2001 | Schena et al. |
| 6,316,710 B1 | 11/2001 | Lindemann |
| 6,317,132 B1 | 11/2001 | Perlin |
| 6,318,087 B1 | 11/2001 | Baumann et al. |
| 6,321,991 B1 | 11/2001 | Knowles |
| 6,323,846 B1 | 11/2001 | Westerman et al. |
| 6,326,962 B1 | 12/2001 | Szabo |
| 6,335,725 B1 | 1/2002 | Koh et al. |
| 6,341,280 B1 | 1/2002 | Glass et al. |
| 6,341,290 B1 | 1/2002 | Lombardo et al. |
| 6,344,906 B1 | 2/2002 | Gatto et al. |
| 6,346,933 B1 | 2/2002 | Lin |
| 6,347,290 B1 | 2/2002 | Bartlett |
| 6,351,222 B1 | 2/2002 | Swan et al. |
| 6,356,281 B1 | 3/2002 | Isenman |
| 6,356,899 B1 | 3/2002 | Chakrabarti et al. |
| 6,360,951 B1 | 3/2002 | Swinehart |
| 6,363,160 B1 | 3/2002 | Bradski et al. |
| RE37,654 E | 4/2002 | Longo |
| 6,366,288 B1 | 4/2002 | Naruki et al. |
| 6,369,811 B1 | 4/2002 | Graham et al. |
| 6,377,296 B1 | 4/2002 | Zlatsin et al. |
| 6,377,712 B1 | 4/2002 | Georgiev et al. |
| 6,377,986 B1 | 4/2002 | Philyaw et al. |
| 6,378,075 B1 | 4/2002 | Goldstein et al. |
| 6,380,931 B1 | 4/2002 | Gillespie et al. |
| 6,381,602 B1 | 4/2002 | Shoroff et al. |
| 6,384,744 B1 | 5/2002 | Philyaw et al. |
| 6,384,829 B1 | 5/2002 | Prevost et al. |
| 6,393,443 B1 | 5/2002 | Rubin et al. |
| 6,396,523 B1 | 5/2002 | Segal et al. |
| 6,396,951 B1 | 5/2002 | Grefenstette et al. |
| 6,400,845 B1 | 6/2002 | Volino |
| 6,404,438 B1 | 6/2002 | Hatlelid et al. |
| 6,408,257 B1 | 6/2002 | Harrington et al. |
| 6,414,671 B1 | 7/2002 | Gillespie et al. |
| 6,417,797 B1 | 7/2002 | Cousins et al. |
| 6,418,433 B1 | 7/2002 | Chakrabarti et al. |
| 6,421,453 B1 | 7/2002 | Kanevsky et al. |
| 6,421,675 B1 | 7/2002 | Ryan et al. |
| 6,429,899 B1 | 8/2002 | Nio et al. |
| 6,430,554 B1 | 8/2002 | Rothschild |
| 6,430,567 B2 | 8/2002 | Burridge |
| 6,433,784 B1 | 8/2002 | Merrick et al. |
| 6,434,561 B1 | 8/2002 | Durst, Jr. et al. |
| 6,434,581 B1 | 8/2002 | Forcier |
| 6,438,523 B1 | 8/2002 | Oberteuffer et al. |
| 6,448,979 B1 | 9/2002 | Schena et al. |
| 6,449,616 B1 | 9/2002 | Walker et al. |
| 6,454,626 B1 | 9/2002 | An |
| 6,460,036 B1 | 10/2002 | Herz |
| 6,466,198 B1 | 10/2002 | Feinstein |
| 6,476,830 B1 | 11/2002 | Farmer et al. |
| 6,476,834 B1 | 11/2002 | Doval et al. |
| 6,477,239 B1 | 11/2002 | Ohki et al. |
| 6,483,513 B1 | 11/2002 | Haratsch et al. |
| 6,484,156 B1 | 11/2002 | Gupta et al. |
| 6,486,874 B1 | 11/2002 | Muthuswamy et al. |
| 6,486,892 B1 | 11/2002 | Stern |
| 6,489,970 B1 | 12/2002 | Pazel |
| 6,491,217 B2 | 12/2002 | Catan |
| 6,498,970 B2 | 12/2002 | Colmenarez et al. |
| 6,504,138 B1 | 1/2003 | Mangerson |
| 6,507,349 B1 | 1/2003 | Balassanian |
| 6,508,706 B2 | 1/2003 | Sitrick et al. |
| 6,509,707 B2 | 1/2003 | Yamashita et al. |
| 6,509,912 B1 | 1/2003 | Moran et al. |
| 6,510,387 B2 | 1/2003 | Fuchs et al. |
| 6,510,417 B1 | 1/2003 | Woods et al. |
| 6,518,950 B1 | 2/2003 | Dougherty et al. |
| 6,520,407 B1 | 2/2003 | Nieswand et al. |
| 6,522,333 B1 | 2/2003 | Hatlelid et al. |
| 6,525,749 B1 | 2/2003 | Moran et al. |
| 6,526,395 B1 | 2/2003 | Morris |
| 6,526,449 B1 | 2/2003 | Philyaw et al. |
| 6,532,007 B1 | 3/2003 | Matsuda |
| 6,538,187 B2 | 3/2003 | Beigi |
| 6,539,931 B2 | 4/2003 | Trajkovic et al. |
| 6,540,141 B1 | 4/2003 | Dougherty et al. |
| 6,542,933 B1 | 4/2003 | Durst, Jr. et al. |
| 6,543,052 B1 | 4/2003 | Ogasawara |

| | | | | | | | |
|---|---|---|---|---|---|---|---|
| 6,545,669 | B1 | 4/2003 | Kinawi et al. | 6,721,921 | B1 | 4/2004 | Altman |
| 6,546,385 | B1 | 4/2003 | Mao et al. | 6,725,125 | B2 | 4/2004 | Basson et al. |
| 6,546,405 | B2 | 4/2003 | Gupta et al. | 6,725,203 | B1 | 4/2004 | Seet et al. |
| 6,549,751 | B1 | 4/2003 | Mandri | 6,725,260 | B1 | 4/2004 | Philyaw |
| 6,549,891 | B1 * | 4/2003 | Rauber et al. .................. 705/28 | 6,728,000 | B1 | 4/2004 | Lapstun et al. |
| 6,554,433 | B1 | 4/2003 | Holler | 6,735,632 | B1 | 5/2004 | Kiraly et al. |
| 6,560,281 | B1 | 5/2003 | Black et al. | 6,738,519 | B1 | 5/2004 | Nishiwaki |
| 6,564,144 | B1 | 5/2003 | Cherveny | 6,741,745 | B2 | 5/2004 | Dance et al. |
| 6,570,555 | B1 | 5/2003 | Prevost et al. | 6,741,871 | B1 * | 5/2004 | Silverbrook et al. ......... 455/557 |
| 6,571,193 | B1 | 5/2003 | Unuma et al. | 6,744,938 | B1 | 6/2004 | Rantze et al. |
| 6,571,235 | B1 | 5/2003 | Marpe et al. | 6,745,234 | B1 | 6/2004 | Philyaw et al. |
| 6,573,883 | B1 | 6/2003 | Bartlett | 6,747,632 | B2 | 6/2004 | Howard |
| 6,577,329 | B1 | 6/2003 | Flickner et al. | 6,748,306 | B2 | 6/2004 | Lipowicz |
| 6,577,953 | B1 | 6/2003 | Swope et al. | 6,750,852 | B2 | 6/2004 | Gillespie et al. |
| 6,587,835 | B1 | 7/2003 | Treyz et al. | 6,752,498 | B2 | 6/2004 | Covannon et al. |
| 6,593,723 | B1 | 7/2003 | Johnson | 6,753,883 | B2 | 6/2004 | Schena et al. |
| 6,594,616 | B2 | 7/2003 | Zhang et al. | 6,754,632 | B1 | 6/2004 | Kalinowski et al. |
| 6,594,705 | B1 | 7/2003 | Philyaw | 6,754,698 | B1 | 6/2004 | Philyaw et al. |
| 6,597,443 | B2 | 7/2003 | Boman | 6,757,715 | B1 | 6/2004 | Philyaw |
| 6,599,130 | B2 | 7/2003 | Moehrle | 6,757,783 | B2 | 6/2004 | Koh |
| 6,600,475 | B2 | 7/2003 | Gutta et al. | 6,758,398 | B1 | 7/2004 | Philyaw et al. |
| 6,610,936 | B2 | 8/2003 | Gillespie et al. | 6,760,661 | B2 | 7/2004 | Klein et al. |
| 6,615,136 | B1 | 9/2003 | Swope et al. | 6,766,494 | B1 | 7/2004 | Price et al. |
| 6,615,268 | B1 | 9/2003 | Philyaw et al. | 6,766,956 | B1 | 7/2004 | Boylan, III et al. |
| 6,617,369 | B2 | 9/2003 | Parfondry et al. | 6,772,047 | B2 | 8/2004 | Butikofer |
| 6,618,504 | B1 | 9/2003 | Yoshino | 6,772,338 | B1 | 8/2004 | Hull |
| 6,618,732 | B1 | 9/2003 | White et al. | 6,773,177 | B2 | 8/2004 | Denoue et al. |
| 6,622,165 | B1 | 9/2003 | Philyaw | 6,778,988 | B2 | 8/2004 | Bengtson |
| 6,624,833 | B1 | 9/2003 | Kumar et al. | 6,783,071 | B2 * | 8/2004 | Levine et al. ............. 235/462.13 |
| 6,625,335 | B1 | 9/2003 | Kanai | 6,785,421 | B1 | 8/2004 | Gindele et al. |
| 6,625,581 | B1 | 9/2003 | Perkowski | 6,786,793 | B1 | 9/2004 | Wang |
| 6,628,295 | B2 | 9/2003 | Wilensky | 6,788,809 | B1 | 9/2004 | Grzeszczuk et al. |
| 6,629,133 | B1 | 9/2003 | Philyaw et al. | 6,788,815 | B2 | 9/2004 | Lui et al. |
| 6,630,924 | B1 | 10/2003 | Peck | 6,791,536 | B2 | 9/2004 | Keely et al. |
| 6,631,404 | B1 | 10/2003 | Philyaw | 6,791,588 | B1 | 9/2004 | Philyaw |
| 6,636,763 | B1 | 10/2003 | Junker et al. | 6,792,112 | B1 | 9/2004 | Campbell et al. |
| 6,636,892 | B1 | 10/2003 | Philyaw | 6,792,452 | B1 | 9/2004 | Philyaw |
| 6,636,896 | B1 | 10/2003 | Philyaw | 6,798,429 | B2 | 9/2004 | Bradski |
| 6,638,314 | B1 | 10/2003 | Meyerzon et al. | 6,801,637 | B2 | 10/2004 | Voronka et al. |
| 6,638,317 | B2 | 10/2003 | Nakao et al. | 6,804,396 | B2 | 10/2004 | Higaki et al. |
| 6,640,145 | B2 | 10/2003 | Hoffberg et al. | 6,804,659 | B1 | 10/2004 | Graham et al. |
| 6,643,692 | B1 | 11/2003 | Philyaw et al. | 6,813,039 | B1 | 11/2004 | Silverbrook et al. |
| 6,650,761 | B1 | 11/2003 | Rodriguez et al. | 6,816,894 | B1 | 11/2004 | Philyaw et al. |
| 6,651,053 | B1 | 11/2003 | Rothschild | 6,822,639 | B1 | 11/2004 | Silverbrook et al. |
| 6,658,151 | B2 | 12/2003 | Lee et al. | 6,823,075 | B2 | 11/2004 | Perry |
| 6,661,919 | B2 | 12/2003 | Nicholson et al. | 6,823,388 | B1 | 11/2004 | Philyaw et al. |
| 6,664,991 | B1 | 12/2003 | Chew et al. | 6,824,044 | B1 | 11/2004 | Lapstun et al. |
| 6,669,088 | B2 | 12/2003 | Veeneman | 6,824,057 | B2 | 11/2004 | Rathus et al. |
| 6,671,684 | B1 * | 12/2003 | Hull et al. .......................... 707/6 | 6,825,956 | B2 | 11/2004 | Silverbrook et al. |
| 6,677,969 | B1 | 1/2004 | Hongo | 6,826,592 | B1 | 11/2004 | Philyaw et al. |
| 6,678,075 | B1 | 1/2004 | Tsai et al. | 6,827,259 | B2 | 12/2004 | Rathus et al. |
| 6,678,664 | B1 | 1/2004 | Ganesan | 6,827,267 | B2 | 12/2004 | Rathus et al. |
| 6,681,031 | B2 | 1/2004 | Cohen et al. | 6,829,650 | B1 | 12/2004 | Philyaw et al. |
| 6,686,844 | B2 | 2/2004 | Watanabe et al. | 6,830,187 | B2 | 12/2004 | Rathus et al. |
| 6,687,612 | B2 | 2/2004 | Cherveny | 6,830,188 | B2 | 12/2004 | Rathus et al. |
| 6,688,081 | B2 | 2/2004 | Boyd | 6,832,116 | B1 | 12/2004 | Tillgren et al. |
| 6,688,522 | B1 | 2/2004 | Philyaw et al. | 6,833,936 | B1 | 12/2004 | Seymour |
| 6,688,523 | B1 | 2/2004 | Koenck | 6,834,804 | B2 | 12/2004 | Rathus et al. |
| 6,688,525 | B1 | 2/2004 | Nelson et al. | 6,836,799 | B1 | 12/2004 | Philyaw et al. |
| 6,690,358 | B2 | 2/2004 | Kaplan | 6,850,252 | B1 | 2/2005 | Hoffberg |
| 6,691,123 | B1 | 2/2004 | Guliksen | 6,862,046 | B2 * | 3/2005 | Ko ................................ 348/569 |
| 6,691,151 | B1 | 2/2004 | Cheyer et al. | 6,868,193 | B1 | 3/2005 | Gharbia et al. |
| 6,691,194 | B1 | 2/2004 | Ofer | 6,879,957 | B1 | 4/2005 | Pechter et al. |
| 6,691,914 | B2 | 2/2004 | Isherwood et al. | 6,880,122 | B1 | 4/2005 | Lee et al. |
| 6,692,259 | B2 | 2/2004 | Kumar et al. | 6,886,104 | B1 | 4/2005 | McClurg et al. |
| 6,694,356 | B1 * | 2/2004 | Philyaw ....................... 709/217 | 6,898,592 | B2 | 5/2005 | Peltonen et al. |
| 6,697,838 | B1 | 2/2004 | Jakobson | 6,922,725 | B2 | 7/2005 | Lamming et al. |
| 6,697,949 | B1 | 2/2004 | Philyaw et al. | 6,931,592 | B1 | 8/2005 | Ramaley et al. |
| H2098 | H | 3/2004 | Morin | 6,938,024 | B1 | 8/2005 | Horvitz |
| 6,701,354 | B1 | 3/2004 | Philyaw et al. | 6,947,571 | B1 | 9/2005 | Rhoads et al. |
| 6,701,369 | B1 | 3/2004 | Philyaw | 6,947,930 | B2 | 9/2005 | Anick et al. |
| 6,704,024 | B2 | 3/2004 | Robotham et al. | 6,970,915 | B1 | 11/2005 | Partovi et al. |
| 6,704,699 | B2 | 3/2004 | Nir et al. | 6,978,297 | B1 | 12/2005 | Piersol |
| 6,707,581 | B1 | 3/2004 | Browning | 6,985,169 | B1 | 1/2006 | Deng et al. |
| 6,708,208 | B1 | 3/2004 | Philyaw | 6,991,158 | B2 | 1/2006 | Munte |
| 6,714,677 | B1 | 3/2004 | Stearns et al. | 6,992,655 | B2 | 1/2006 | Ericson et al. |
| 6,714,969 | B1 | 3/2004 | Klein et al. | 6,993,580 | B2 | 1/2006 | Isherwood et al. |
| 6,718,308 | B1 | 4/2004 | Nolting | 7,001,681 | B2 | 2/2006 | Wood |
| 6,720,984 | B1 | 4/2004 | Jorgensen et al. | 7,006,881 | B1 | 2/2006 | Hoffberg et al. |

| Patent/Pub No. | Date | Name |
|---|---|---|
| 7,016,084 B2 | 3/2006 | Tsai |
| 7,043,489 B1 | 5/2006 | Kelley |
| 7,051,943 B2 | 5/2006 | Leone et al. |
| 7,057,607 B2 | 6/2006 | Mayoraz et al. |
| 7,062,706 B2 | 6/2006 | Maxwell et al. |
| 7,069,240 B2 | 6/2006 | Spero et al. |
| 7,079,713 B2 | 7/2006 | Simmons |
| 7,096,218 B2 | 8/2006 | Schirmer et al. |
| 7,103,848 B2 | 9/2006 | Barsness et al. |
| 7,110,576 B2 | 9/2006 | Norris, Jr. et al. |
| 7,111,787 B2 | 9/2006 | Ehrhart |
| 7,117,374 B2 | 10/2006 | Hill et al. |
| 7,121,469 B2 | 10/2006 | Dorai et al. |
| 7,124,093 B1 | 10/2006 | Graham et al. |
| 7,130,885 B2 | 10/2006 | Chandra et al. |
| 7,136,814 B1 | 11/2006 | McConnell |
| 7,139,445 B2 | 11/2006 | Pilu et al. |
| 7,151,864 B2 | 12/2006 | Henry et al. |
| 7,174,054 B2 | 2/2007 | Manber et al. |
| 7,197,716 B2 | 3/2007 | Newell et al. |
| 7,203,158 B2 | 4/2007 | Oshima et al. |
| 7,224,820 B2 | 5/2007 | Inomata et al. |
| 7,225,979 B2 | 6/2007 | Silverbrook et al. |
| 7,234,645 B2 | 6/2007 | Silverbrook et al. |
| 7,240,843 B2 | 7/2007 | Paul et al. |
| 7,246,118 B2 | 7/2007 | Chastain et al. |
| 7,263,521 B2 | 8/2007 | Carpentier et al. |
| 7,275,049 B2 | 9/2007 | Clausner et al. |
| 7,289,806 B2 | 10/2007 | Morris et al. |
| 7,299,186 B2 | 11/2007 | Kuzunuki et al. |
| 7,299,969 B2 | 11/2007 | Paul et al. |
| 7,331,523 B2 | 2/2008 | Meier et al. |
| 7,415,670 B2 | 8/2008 | Hull et al. |
| 7,421,155 B2 | 9/2008 | King et al. |
| 7,437,023 B2 | 10/2008 | King et al. |
| 7,487,112 B2 | 2/2009 | Barnes, Jr. |
| 7,493,487 B2 | 2/2009 | Phillips et al. |
| 7,505,785 B2 | 3/2009 | Callaghan et al. |
| 7,523,067 B1 | 4/2009 | Nakajima |
| 7,533,040 B2 | 5/2009 | Perkowski |
| 7,593,605 B2 | 9/2009 | King et al. |
| 7,596,269 B2 | 9/2009 | King et al. |
| 7,599,580 B2 | 10/2009 | King et al. |
| 7,599,844 B2 | 10/2009 | King et al. |
| 7,606,741 B2 | 10/2009 | King et al. |
| 7,616,840 B2 | 11/2009 | Erol et al. |
| 7,660,813 B2 | 2/2010 | Milic-Frayling et al. |
| 7,672,543 B2 | 3/2010 | Hull et al. |
| 7,680,067 B2 | 3/2010 | Prasad et al. |
| 7,702,624 B2 | 4/2010 | King et al. |
| 7,706,611 B2 | 4/2010 | King et al. |
| 7,707,039 B2 | 4/2010 | King et al. |
| 7,742,953 B2 | 6/2010 | King et al. |
| 7,812,860 B2 | 10/2010 | King et al. |
| 7,818,215 B2 | 10/2010 | King et al. |
| 7,831,912 B2 | 11/2010 | King et al. |
| 7,872,669 B2 | 1/2011 | Darrell et al. |
| 7,894,670 B2 | 2/2011 | King et al. |
| 2001/0001854 A1 | 5/2001 | Schena et al. |
| 2001/0003176 A1 | 6/2001 | Schena et al. |
| 2001/0003177 A1 | 6/2001 | Schena et al. |
| 2001/0032252 A1 | 10/2001 | Durst et al. |
| 2001/0034237 A1 | 10/2001 | Garahi |
| 2001/0045463 A1* | 11/2001 | Madding et al. ......... 235/462.14 |
| 2001/0049636 A1 | 12/2001 | Hudda et al. |
| 2001/0053252 A1* | 12/2001 | Creque ........................ 382/305 |
| 2001/0056463 A1 | 12/2001 | Grady et al. |
| 2002/0002504 A1 | 1/2002 | Engel et al. |
| 2002/0013781 A1 | 1/2002 | Petersen |
| 2002/0016750 A1 | 2/2002 | Attia |
| 2002/0020750 A1 | 2/2002 | Dymetman et al. |
| 2002/0022993 A1* | 2/2002 | Miller et al. ..................... 705/14 |
| 2002/0023158 A1 | 2/2002 | Polizzi et al. |
| 2002/0023215 A1 | 2/2002 | Wang et al. |
| 2002/0023957 A1* | 2/2002 | Michaelis et al. ............ 235/454 |
| 2002/0023959 A1 | 2/2002 | Miller et al. |
| 2002/0029350 A1 | 3/2002 | Cooper et al. |
| 2002/0038456 A1 | 3/2002 | Hansen et al. |
| 2002/0049781 A1 | 4/2002 | Bengtson |
| 2002/0051262 A1 | 5/2002 | Nuttall et al. |
| 2002/0052747 A1 | 5/2002 | Sarukkai |
| 2002/0055906 A1 | 5/2002 | Katz et al. |
| 2002/0073000 A1* | 6/2002 | Sage ............................... 705/29 |
| 2002/0075298 A1 | 6/2002 | Schena et al. |
| 2002/0076110 A1 | 6/2002 | Zee |
| 2002/0082931 A1* | 6/2002 | Siegel et al. ..................... 705/26 |
| 2002/0090132 A1 | 7/2002 | Boncyk et al. |
| 2002/0091569 A1 | 7/2002 | Kitaura et al. |
| 2002/0099812 A1 | 7/2002 | Davis et al. |
| 2002/0102966 A1 | 8/2002 | Lev et al. |
| 2002/0133725 A1 | 9/2002 | Roy et al. |
| 2002/0135815 A1 | 9/2002 | Finn |
| 2002/0161658 A1 | 10/2002 | Sussman |
| 2002/0191847 A1 | 12/2002 | Newman et al. |
| 2002/0194143 A1 | 12/2002 | Banerjee et al. |
| 2002/0199198 A1 | 12/2002 | Stonedahl |
| 2003/0001018 A1 | 1/2003 | Hussey et al. |
| 2003/0004724 A1 | 1/2003 | Kahn et al. |
| 2003/0009495 A1 | 1/2003 | Adjaoute |
| 2003/0019939 A1* | 1/2003 | Sellen ....................... 235/462.45 |
| 2003/0028889 A1 | 2/2003 | McCoskey et al. |
| 2003/0040957 A1 | 2/2003 | Rodriguez et al. |
| 2003/0043042 A1* | 3/2003 | Moores et al. ............. 340/573.1 |
| 2003/0046307 A1 | 3/2003 | Rivette et al. |
| 2003/0050854 A1 | 3/2003 | Showghi et al. |
| 2003/0065770 A1 | 4/2003 | Davis et al. |
| 2003/0081251 A1* | 5/2003 | Tanaka et al. ................. 358/1.15 |
| 2003/0093384 A1 | 5/2003 | Durst et al. |
| 2003/0093400 A1* | 5/2003 | Santosuosso ..................... 707/1 |
| 2003/0093545 A1* | 5/2003 | Liu et al. ........................ 709/231 |
| 2003/0098352 A1 | 5/2003 | Schnee et al. |
| 2003/0106018 A1 | 6/2003 | Silverbrook et al. |
| 2003/0130904 A1 | 7/2003 | Katz et al. |
| 2003/0132298 A1 | 7/2003 | Swartz et al. |
| 2003/0142334 A1* | 7/2003 | Currans et al. ................ 358/1.13 |
| 2003/0144865 A1 | 7/2003 | Lin et al. |
| 2003/0150907 A1 | 8/2003 | Metcalf et al. |
| 2003/0173405 A1* | 9/2003 | Wilz et al. ................ 235/462.01 |
| 2003/0179908 A1 | 9/2003 | Mahoney et al. |
| 2003/0187886 A1 | 10/2003 | Hull et al. |
| 2003/0200152 A1 | 10/2003 | Divekar |
| 2003/0214528 A1 | 11/2003 | Pierce et al. |
| 2003/0218070 A1 | 11/2003 | Tsikos et al. |
| 2003/0225547 A1 | 12/2003 | Paradies |
| 2004/0001217 A1 | 1/2004 | Wu |
| 2004/0015606 A1 | 1/2004 | Philyaw |
| 2004/0032624 A1* | 2/2004 | Stevens et al. ................. 358/402 |
| 2004/0036718 A1 | 2/2004 | Warren et al. |
| 2004/0042667 A1 | 3/2004 | Lee et al. |
| 2004/0044576 A1 | 3/2004 | Kurihara et al. |
| 2004/0044952 A1 | 3/2004 | Jiang et al. |
| 2004/0052400 A1 | 3/2004 | Inomata et al. |
| 2004/0059779 A1 | 3/2004 | Philyaw |
| 2004/0064453 A1 | 4/2004 | Ruiz et al. |
| 2004/0068483 A1 | 4/2004 | Sakurai et al. |
| 2004/0073708 A1 | 4/2004 | Warnock |
| 2004/0073874 A1 | 4/2004 | Poibeau et al. |
| 2004/0075686 A1 | 4/2004 | Watler et al. |
| 2004/0078749 A1 | 4/2004 | Hull et al. |
| 2004/0098165 A1 | 5/2004 | Butikofer |
| 2004/0121815 A1 | 6/2004 | Fournier et al. |
| 2004/0122811 A1 | 6/2004 | Page |
| 2004/0128514 A1 | 7/2004 | Rhoads |
| 2004/0158492 A1 | 8/2004 | Lopez et al. |
| 2004/0186766 A1 | 9/2004 | Fellenstein et al. |
| 2004/0186859 A1 | 9/2004 | Butcher |
| 2004/0193488 A1 | 9/2004 | Khoo et al. |
| 2004/0199615 A1 | 10/2004 | Philyaw |
| 2004/0206809 A1 | 10/2004 | Wood et al. |
| 2004/0208369 A1 | 10/2004 | Nakayama |
| 2004/0208372 A1 | 10/2004 | Boncyk et al. |
| 2004/0210943 A1 | 10/2004 | Philyaw |
| 2004/0217160 A1 | 11/2004 | Silverbrook et al. |
| 2004/0220975 A1 | 11/2004 | Carpentier et al. |
| 2004/0229194 A1 | 11/2004 | Yang |
| 2004/0230837 A1 | 11/2004 | Philyaw et al. |
| 2004/0243601 A1 | 12/2004 | Toshima |
| 2004/0256454 A1 | 12/2004 | Kocher |

| | | |
|---|---|---|
| 2004/0258274 A1 | 12/2004 | Brundage et al. |
| 2004/0258275 A1 | 12/2004 | Rhoads |
| 2004/0260470 A1 | 12/2004 | Rast |
| 2004/0260618 A1 | 12/2004 | Larson |
| 2004/0267734 A1 | 12/2004 | Toshima |
| 2005/0005168 A1 | 1/2005 | Dick |
| 2005/0076095 A1 | 4/2005 | Mathew et al. |
| 2005/0086309 A1 | 4/2005 | Galli et al. |
| 2005/0136949 A1 | 6/2005 | Barnes, Jr. |
| 2005/0144074 A1 | 6/2005 | Fredregill et al. |
| 2005/0149516 A1 | 7/2005 | Wolf et al. |
| 2005/0149538 A1 | 7/2005 | Singh et al. |
| 2005/0154760 A1 | 7/2005 | Bhakta et al. |
| 2005/0193125 A1* | 9/2005 | Philyaw .................. 709/228 |
| 2005/0222801 A1 | 10/2005 | Wulff et al. |
| 2005/0228683 A1 | 10/2005 | Saylor et al. |
| 2005/0242188 A1* | 11/2005 | Vesuna .................. 235/462.46 |
| 2005/0278179 A1 | 12/2005 | Overend et al. |
| 2005/0288954 A1 | 12/2005 | McCarthy et al. |
| 2006/0023945 A1 | 2/2006 | King et al. |
| 2006/0036462 A1 | 2/2006 | King et al. |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0045374 A1 | 3/2006 | Kim et al. |
| 2006/0053097 A1 | 3/2006 | King et al. |
| 2006/0069616 A1 | 3/2006 | Bau |
| 2006/0075327 A1 | 4/2006 | Sriver et al. |
| 2006/0080314 A1 | 4/2006 | Hubert et al. |
| 2006/0081714 A1 | 4/2006 | King et al. |
| 2006/0085477 A1 | 4/2006 | Phillips et al. |
| 2006/0085638 A1* | 4/2006 | Phillips et al. ............ 713/168 |
| 2006/0098900 A1 | 5/2006 | King et al. |
| 2006/0104515 A1 | 5/2006 | King et al. |
| 2006/0119900 A1 | 6/2006 | King et al. |
| 2006/0122983 A1 | 6/2006 | King et al. |
| 2006/0126131 A1 | 6/2006 | Tseng et al. |
| 2006/0136629 A1 | 6/2006 | King et al. |
| 2006/0138219 A1* | 6/2006 | Brzeziak et al. ............ 235/383 |
| 2006/0173859 A1 | 8/2006 | Kim et al. |
| 2006/0195695 A1 | 8/2006 | Keys |
| 2006/0224895 A1 | 10/2006 | Mayer |
| 2006/0229940 A1 | 10/2006 | Grossman |
| 2007/0005570 A1 | 1/2007 | Hurst-Hiller et al. |
| 2007/0061146 A1 | 3/2007 | Jaramillo et al. |
| 2007/0099636 A1 | 5/2007 | Roth |
| 2007/0170248 A1 | 7/2007 | Brundage et al. |
| 2007/0208561 A1 | 9/2007 | Choi et al. |
| 2007/0208732 A1 | 9/2007 | Flowers et al. |
| 2007/0249406 A1 | 10/2007 | Andreasson |
| 2007/0279711 A1 | 12/2007 | King et al. |
| 2007/0300142 A1 | 12/2007 | King et al. |
| 2008/0046417 A1 | 2/2008 | Jeffery et al. |
| 2008/0071775 A1 | 3/2008 | Gross |
| 2008/0137971 A1 | 6/2008 | King et al. |
| 2008/0141117 A1 | 6/2008 | King et al. |
| 2008/0177825 A1 | 7/2008 | Dubinko et al. |
| 2008/0235093 A1 | 9/2008 | Uland |
| 2008/0313172 A1 | 12/2008 | King et al. |
| 2009/0012806 A1 | 1/2009 | Ricordi et al. |
| 2009/0077658 A1 | 3/2009 | King et al. |
| 2010/0092095 A1 | 4/2010 | King et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0278453 A1 | 11/2010 | King et al. |
| 2010/0318797 A1 | 12/2010 | King et al. |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0072395 A1 | 3/2011 | King et al. |
| 2011/0075228 A1 | 3/2011 | King et al. |
| 2011/0078585 A1 | 3/2011 | King et al. |
| 2011/0085211 A1 | 4/2011 | King et al. |

FOREIGN PATENT DOCUMENTS

| | | |
|---|---|---|
| EP | 0544434 | 6/1993 |
| EP | 0596247 | 5/1994 |
| EP | 0887753 | 12/1998 |
| EP | 1141882 | 10/2001 |
| EP | 1398711 | 3/2004 |
| JP | 3260768 | 11/1991 |
| JP | 10-133847 | 5/1998 |
| JP | 2003216631 | 7/2003 |
| KR | 10-2000-0054339 | 9/2000 |
| KR | 10-2000-0054268 | 10/2002 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | WO-00/67091 | 11/2000 |
| WO | 01/03017 | 1/2001 |
| WO | 01/33553 | 5/2001 |
| WO | WO-02/11446 A2 | 2/2002 |
| WO | WO-02/091233 A2 | 11/2002 |
| WO | WO-2004/084109 | 9/2004 |
| WO | WO-2005/071665 A1 | 8/2005 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/014255 | 1/2008 |
| WO | WO-2008/002074 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

"Automatic Computer Translation," www.lingolex.com/translationsoftware.htm, downloaded on Aug. 6, 2000.

Babylon—Online Dictionary and Translation Software, "Text Translations in 75 languages, all in a single click," 1997, 1 page.

Black et al., "The Festival Speech Synthesis System," Festival Speech Synthesis System—Table of Contents, http://www.cstr.ed.ac.uk/projects/festival manual/, Jun. 17, 1999, pp. 1-4 [internet accessed on Jan. 10, 2008].

eBooks, eBooks Quickstart Guide, nl-487, 2001, 2 pages.

Gildea and Miller, "How Children Learn Words," Scientific American, Sep. 1987, vol. 257, No. 3, pp. 94-99.

Globalink, Inc. "Globalink, Inc. announces Talk to Me, an interactive language learning software program," Talk to me Software, Business Wire, Jan. 21, 1997, Fairfax, VA, 4 pages [internet accessed on Jan. 4, 2008].

Henseler, Dr. Hans, "Functional and Document Level Security in ZyIMAGE," Zylab, the Paper Filing Company, ZyIMAGE Security, Whitepaper, Apr. 9, 2004, 27 pgs, ZyLAB Technologies, B.V.

Jacobson et al., "The Last Book", IBM Systems Journal, vol. 36, No. 3, 1997, pp. 457-463.

Macholl, R., "Translation Pen Lacks Practicality," BYTE.com, Jan. 1998, 2 pages.

Nagy et al. "A Prototype Document Image Analysis System for Technical Journals," Computer, vol. 25, issue 7, Jul. 1992, pp. 10-22.

O'Gorman, "Image and Document Processing Techniques for the Right Pages Electronic Library System," 11th International Conference on Pattern Recognition, Aug. 30-Sep. 3, 1992, The Hague, The Netherlands, pp. 260-263, IEEE Computer Society Press, Los Alamitos, CA.

Pellissippi Library, NetLibrary, Skills Guide #4, Sep. 21, 2001, 9 pages.

Schuuring, D., "Best practices in e-discovery and e-disclosure," ZyLAB Information Access Solutions, White Paper, Feb. 17, 2006, 72 pgs, ZyLAB Distributing, B.V.

Sheridon et al., "The Gyricon—A Twisting Ball Display," Proceedings of the Society for Information Display, Third and Fourth Quarter, May 1977, pp. 289-293, Boston, MA.

Stifelman, Lisa J., "Augmenting Real-World Objects: A Paper-Based Audio Notebook," Proceedings of CHI '96, 1996, pp. 199-200.

Story et al. "The Right Pages Image-Based Electronic Library for Alerting and Browsing," Computer, vol. 25, No. 9, Sep. 1992, pp. 17-26.

The Festival Speech Synthesis System, www.cstr.ed.ac.uk/projects/festival downloaded on Jul. 25, 2000, 2 pages [internet accessed Jan. 4, 2008].

Toshifumi et al., "PaperLink: A Technique for Hyperlinking from Real Paper to Electronic Content," Proceedings of CHI 1997, pp. 1-13, CHI 97 Electronic Publications: Papers.

Whittaker et al., "Filochat: Handwritten Notes Provide Access to Recorded Conversations," Human Factors in Computing Systems, CHI '94 Conference Proceedings, Apr. 24-28, 1994, pp. 271-277, Boston Massachusetts.

Whittaker et al., "Using Cognitive Artifacts in the Design of Mulimodal Interfaces," AT&T Labs-Research, May 24, 2004, 63 pages.

Wilcox et al., "Dynomite: A Dynamically Organized Ink and Audio Notebook," Conference on Human Factors in Computing Systems, Jun. 3, 1998, 9 pages.

Agilent Technologies. "Agilent ADNK-2133 Optical Mouse Designer's Kit: Product Overview." 2004, 6 pp.

Airclic. "Products." http://www.airclic.com/products.asp, accessed Oct. 3, 2005, 3pp.

Arai, Toshifumi, Dietmar Aust, Scott E. Hudson, "Paperlink: A Technique for Hyperlinking From Real Paper to Electronic Content." *Proceedings of the ACM Conference on Human Factors in Computing Systems (CHI 97)*, Addison-Wesley, Apr. 1997, pp. 327-334.

Aust, Dietmar. "Augmenting Paper Documents with Digital Information in a Mobile Environment" MS Thesis, University of Dortmund, Department of Computer Graphics, 1996. 47pp.

Bai, Zhen-Long, and Qiang Huo "An Approach to Extracting the Target Text Line from a Document Image Captured by a Pen Scanner." *Proceedings of the Seventh International Conference on Document Analysis and Recognition (ICDAR 2003)*, 2003, 5 pp.

Bell, Timothy, Ian H. Witten, John G. Cleary. "Modeling for Text Compression." *ACM Computing Surveys*, vol. 21, No. 4, Dec. 1989, pp. 557-591.

Bentley, Jon L. and Robert Sedgewick. "Fast Algorithms for Sorting and Searching Strings." *Proceedings of the 10th ACM-SIAM Symposium on Discrete Algorithms*. New York, NY: ACM Press, 1997, pp. 360-369.

Burle Technical Memorandum. "Fiber Optics: Theory and Applications." http://www.burle.com/cgi-bin/byteserver.pl/pdf/100r.pdf, 19pp.

Bäumer, Stefan (Ed.) *Handbook of Plastic Optics*. Weinheim, Germany: WILEY-VCH Verlag GmbH & Co. KgaA. 2005, 199pp.

C Technologies AB. "CPEN User's Guide." Jan. 2001 130pp.

U.S. Appl. No. 60/201,570, Bengston.

C Technologies AB. "User's Guide for C-Pen 10." Aug. 2001, 128pp.

Capobianco, Robert A. "Design Considerations for: Optical Coupling of Flashlamps and Fiber Optics." PerkinElmer, 1998-2003. . http://optoelectronics.perkinelmer.com/content/whitepapers/OpticalCoupling.pdf, 12 pp.

CASIO Computer Co. Ltd, ALPS Electric Co., Ltd. "Alliance Agreement on Development and Mass Production of Fingerprint Scanner for Mobile Devices." Press Release, Feb. 25, 2003. http://world.casio.com/pacific/news/2003/fingerprint.html, 2pp.

Cenker, Christian. "Wavelet Packets and Optimization in Pattern Recognition." *Proceedings of the 21st International Workshop of the AAPR*, Hallstatt, Austria, May 1997, 11pp.

Clancy, Heather. "Cell Phones Get New Job: Portable Scanning." C/Net News.com, news.com.com/2102-1039_5572897.html?tag=st.util.print, Accessed Feb. 13, 2005, 3pp.

Cybertracker. Homepage. http://www.cybertracker.co.za/, accessed Oct. 3, 2005, 2pp.

Digital Convergence. "CueCat." www.cuecat.com, accessed Oct. 3, 2005, 2 pp.

Docuport "DocuPen Operating Manual." Montreal, Quebec, 2004, 48pp.

Doermann, David, Huiping Li, Omid Kia, Kemal Kilic. "The Detection of Duplicates in Document Image Databases." Technical Report. LAMP-TR-005/CAR-TR-850/CS-TR-3739, University of Maryland College Park, Feb. 1997, 39pp.

Doermann, David, J. Sauvola, H. Kauniskangas, C. Shin, M. Pietikäinen & A. Rosenfeld. "The Development of a General Framework for Intelligent Document Image Retrieval." *Series in Machine Perception and Artificial Intelligence*, vol. 29: *Document Analysis Systems II. Washington DC: World Scientific Press*, 1997, 28 pp.

Doermann, David. "The Indexing and Retrieval of Document Images: A Survey." Technical Report. LAMP-TR-0013/CAR-TR-878/CS-TR-3876. University of Maryland College Park, Feb. 1998, 39 pp.

Duong, Jean, Myriam Côté, Hubert Emptoz, Ching Y. Suen. "Extraction of Text Areas in Printed Document Images." *Proceedings of the 2001 ACM Symposium on Document Engineering*. New York, NY: ACM Press, 2001, pp. 157-164.

Erol, Berna, Jonathan J. Hull, and Dar-Shyang Lee. "Linking Multimedia Presentations with their Symbolic Source Documents: Algorithm and Applications." *ACM Multimedia*. New York, NY: ACM Press, 2003, 10pp.

Fall, C.J., A Törcsvári, K. Benzineb, G. Karetka. "Automated Categorization in the International Patent Classification." *ACM SIGIR Forum*. vol. 37, Issue 1, Spring 2003: 10-25.

Ficstar. Homepage. www.ficstar.com, accessed Oct. 4, 2005, 1 p.

Fitzgibbon, Andrew, and Ehud Reiter. "Memories for Life: Managing Information Over a Human Lifetime." UK Computing Research Committee's Grand Challenges in Computing Workshop, May 22, 2003. 8pp.

Ghani, Rayid, Rosie Jones, and Dunja Mladenić. "Mining the Web to Create Minority Language Corpora." Proceedings of the 10th International Conference on Information and Knowledge Management (CIKM). Atlanta, Georgia, Nov. 5-10, 2001, pp. 279-286.

Google. "Google Search Appliance—Intranets." http://www.google.com/appliance/pdf/ds_GSA_intranets.pdf, 2004, 2 pp.

Google. "Simplicity and Enterprise Search.". 2003 http://www.google.com/enterprise/pdf/google_simplicity_enterprise_wp.pdf, 7pp.

Graham, Jamey, Berna Erol, Jonathan J. Hull, and Dar-Shyang Lee. "The Video Paper Multimedia Playback System." *Proceedings of the Eleventh ACM International Conference on Multimedia*. New York, NY: ACM Press, 2003, pp. 94-95.

Grossman, David A, Ophir Frieder, Nazli Goharian "Token Identification" Slideshow. 2002, 15 pp.

Guimbretière, François. "Paper Augmented Digital Documents." *Proceedings of Annual ACM Symposium on User Interfaces Software and Technology*. New York, NY:ACM Press, 2003 10pp.

Hand Held Products "The HHP IMAGETEAM (IT) 4410 and 4410ESD." Brochure, 2pp.

Hansen, Jesse. "A Matlab Project in Optical Character Recognition (OCR)." DSP Lab, University of Rhode Island. May 15, 2002, 6pp.

Heiner, Jeremy M, Scott E. Hudson, Kenichiro Tanaka. "Linking and Messaging from Real Paper in the Paper PDA." *ACM Symposium on User Interface Software and Technology*. New York, NY: ACM Press, 1999, pp. 179-186.

Hewlett-Packard Company. "HP Capshare 920 Portable E-Copier and Information Appliance User Guide, First Edition," 1999, 42 pp.

Hjaltason, Gisli R. and Hanan Samet. "Distance Browsing in Spatial Databases." *ACM Transactions on Database Systems*. vol. 24, No. 2, Jun. 1999: 265-318.

Hong, Tao and Jonathan H. Hull. "Degraded Text Recognition Using Word Collocation and Visual Inter-Word Constraints." *Fourth ACL Conference on Applied Natural Language Processing*, Stuttgart, Germany, 1994, 2pp.

Hopkins, George W., and Tad D. Simons. "A Semi-Imaging Light Pipe for Collecting Weakly Scattered Light." Hewlett Packard Company, Jun. 1998, 6 pp.

Hu, Jianying, Ramanujan Kashi, Gordon Wilfong, "Comparison and Classification of Documents Based on Layout Similarity." Lucent Technologies Bell Labs, Murray Hill, NJ, 2000, 21pp.

Hull, Jonathan J, and Dar-Shyang Lee. "Simultaneous Highlighting of Paper and Electronic Documents." *Proceedings of the International Conference on Pattern Recognition (ICPR '00)*, vol. 4. Barcelona, 2000, 4401-4404.

Hull, Jonathan J, Dar-Shyang Lee, John Cullen, Peter E. Hart. "Document Analysis Techniques for the Infinite Memory Multifunction Machine." DEXA Workshop, 1999. http://www.informatik.uni-trier.de/~ley/db/conf/dexaw/dexaw99.html, 5pp.

Inglis, Stuart and Ian H. Witten. "Compression-Based Template Matching." University of Waikato, Hamilton, New Zealand, 1994, 10 pp.

IPValue Management, Xerox Research Centre Europe. "Technology Licensing Opportunity: Xerox Mobile Camera Document Imaging." Slideshow, Mar. 1, 2004, 11pp.

IRIS. "IRIS Business Card Reader II." Brochure. 2 pp.

IRIS. "IRIS Pen Executive." Brochure, 2 pp.

ISRI Staff. "OCR Accuracy Produced by the Current DOE Document Conversion System." Technical Report Jun. 2002, Information Science Research Institute at the University of Nevada, Las Vegas. May 2002, 9pp.

Jainschigg, John and Richard "Zippy" Grigonis, "M-Commerce Alternatives," Communications Convergence.com, http://www.cconvergence.com/shared/article/showArticle.jhtml?articleId=8701069, May 7, 2001, 14pp.

Janesick, James. "Dueling Detectors." *Spie's OE Magazine*. Feb. 2002: 30-33.

Jenny, Reinhard. "Fundamentals of Fiber Optics: An Introduction for Beginners." Technical Report for Volpi AG, Apr. 26, 2000. http://www.volpiusa.com/whitepapers/FundamentalsofFiberOptics.pdf, 23pp.

Kahan, José and Marja-Riitta Koivunen. "Annotea: An Open RDF Infrastructure for Shared Web Annotations." Proceedings of the 10th International World Wide Web Conference, Hong Kong, 2001. http://www10.org/cdrom/papers/frame.html, pp. 623-632.

Kasabach, Chris, Chris Pacione, John Stivoric, Francine Gemperle, Dan Siewiorek. "Digital Ink: A Familiar Idea with Technological Might!" *CHI 1998 Conference*. New York, NY: ACM Press, 1998, pp. 175-176.

Keytronic. "F-SCAN-S001US Stand Alone Fingerprint Scanner." http://www.keytronic.com/home/shop/Productlist.asp?CATID=62& SubCATID=1, accessed Oct. 4, 2005, 2pp.

Khoubyari, Siamak. "The Application of Word Image Matching in Text Recognition." MS Thesis, State University of New York at Buffalo, Jun. 1992, 107pp.

Kia, Omid and David Doerman. "Integrated Segmentation and Clustering for Enhanced Compression of Document Images." International Conference on Document Analysis and Recognition, Ulm Germany Aug. 18-20, 1997 vol. 1. 6 pp.

Kia, Omid E. "Document Image Compression and Analysis." PhD Thesis, University of Maryland at College Park, 1997, 141pp.

Kia, Omid, David Doerman, Azriel Rosenfeld, Rama Chellappa. "Symbolic Compression and Processing of Document Images." Technical Report: LAMP-TR-004/CFAR-TR-849/CS-TR-3734, University of Maryland, College Park, Jan. 1997, 36pp.

Kia, Omid. "Integrated Segmentation and Clustering for Enhanced Compression of Document Images." International Conference on Document Analysis and Recognition, Ulm, Germany, Aug. 18-20, 1997, 7pp.

Kopec, Gary E, Maya R. Said, Kris Popat. "N-Gram Language Models for Document Image Decoding." *Proceedings of IS&T/SPIE Electronics Imaging 2002: Document Recognition and Retrieval IX*, vol. 4670-20, Jan. 2002, 12pp.

Kopec, Gary E. "Multilevel Character Templates for Document Image Decoding." IS&T/SPIE 1997 International Symposium on Electronic Imaging: Science & Technology, San Jose, CA, Feb. 8-14, 1997, pp. 1-10.

Kukich, Karen. "Techniques for Automatically Correcting Words in Text." *ACM Computing Surveys*, vol. 24, No. 4, Dec. 1992: pp. 377-439.

Lee, Bongsoo, Won Y. Choi, James K. Walker. "Ultrahigh-Resolution Plastic Graded-index fused Image Plates." *Optics Letters*, vol. 24, No. 10, May 15, 2000: 719-721.

Lee, D.L, and F.H. Lochovsky. "Voice Response Systems." *ACM Computing Surveys*, vol. 15, Issue 4, Dec. 1983: pp. 351-374.

Lee, Dar-Shyang and Jonathan J. Hull. "Detecting Duplicates Among Symbolically Compressed Images in a Large Document Database." *Pattern Recognition Letters*, No. 22, 2001: 545-550.

Lee, Dar-Shyang and Jonathan J. Hull. "Duplicate Detection for Symbolically Compressed Documents." Fifth International Conference on Document Analysis and Recognition (ICDAR), 1999, 4pp.

Lee, Dar-Shyang. "Substitution Deciphering Based on HMMs with Applications to Compressed Document Processing." *IEEE Transactions on Pattern Analysis and Machine Intelligence*, vol. 24, No. 12.. Washington DC: IEEE computer Society, Dec. 2002, pp. 1661-1666.

Lesher, G.W., Moulton, B.J. & Higginbotham, D.J. (1999) "Effects of Ngram Order and Training Text Size on Word Prediction." Proceedings of the RESNA '99 Annual Conference, 1999, 3pp.

Lieberman, Henry. "Out of Many, One: Reliable Results from Unreliable Recognition." ACM Conference on Human Factors in Computing Systems (CHI 2002); Apr. 20-25, 2000; Minneapolis; MN; 2 pp.

Lightsource Picture.

Liu, Lon-Mu, Yair M. Babad, Wei Sun, and Ki-Kan Chan. "Adaptive Post-Processing of OCR Text Via Knowledge Acquisition." *Proceedings of the ACM 1991 Computer Science Conference*. New York, NY: ACM Press, 1991, pp. 558-569.

Ljungstrand, Peter, Johan Redström, and Lars Erik Holmquist. "Webstickers: Using Physical Tokens to Access, Manage, and Share Bookmarks to the Web." Proceedings of Designing Augmented Reality Environments 2000, Elsinore, Denmark, Apr. 12-14, 2000, pp. 23-31.

LTI Computer Vision Library "LTI Image Processing Library Developer's Guide. Version 29.10.2003." Aachen, Germany, 2002, 45 pp.

Manolescu, Dragos-Anton. "Feature Extraction—A Pattern for Information Retrieval" *Proceedings of the 5th Pattern Languages of Programming*, Monticello, Illinois, Aug. 1998, 18pp.

McNamee, Paul, James Mayfield, Christine Piatko. "Haircut: A System for Multilingual Text Retrieval in Java." *Journal of Computing Sciences in Small Colleges*. vol. 17, Issue 2, Feb. 2002: 8-22.

Mind Like Water. "Collection Creator." www.collectioncreator.com, accessed Oct. 2, 2005, 3pp.

Muddu, Prashant. "A Study of Image Transmission Through a Fiber-Optic Conduit and its Enhancement Using Digital Image Processing Techniques." Thesis, Florida State College of Engineering, Nov. 18, 2003, 93 pp.

Munich, Mario E, and Pietro Perona. "Visual Input for Pen-Based Computers." *Proceedings of the International Conference on Pattern Recognition (ICPR '96)* vol. III. Los Alamitos, CA: IEEE CS Press. Jun. 1996, 5pp.

Murdoch, Gregary and Nicholas Kushmerick. "Mapping Physical Artifacts to their Web Counterparts: A Case Study with Products Catalogs." MHCI-2004 Workshop on Mobile and Ubiquitous Information Access (Strathclyde, UK). 2004, 7pp.

Nabeshima, Shinji, Shinichirou Yamamoto, Kiyoshi Agusa, Toshio Taguchi. "MEMO-PEN: A New Input Device." *CHI '95 Proceedings Short Papers*. New York, NY: ACM Press, 1995, pp. 256-257.

Nautilus Hyosung. "New Software for Automated Teller Machines." http://www.nautilus.hyosung.com/product_service/software_software05.html, accessed Oct. 4, 2005, 3pp.

NEOMEDIA Technologies "Paperclick for Cellphones." 2004. brochure 2pp.

NEOMEDIA Technologies "Paperclick Linking Services." Brochure. 2004, 1 page.

NEOMEDIA Technologies. "For Wireless Communication Providers." Brochure. 2004, 1 page.

Neville, Sean. "Project Atom, Amazon, Mobile Web Services, and Fireflies at REST" Artima Weblogs, http://www.artima.com/weblogs/viewpost.jsp?thread=18731, Oct. 24, 2003, 4pp.

Newman, William and Pierre Wellner. "A Desk Supporting Computer-based Interaction with Paper Documents." *Proceedings of ACM CHI'92 Conference on Human Factors in Computing Systems*. New York, NY: ACM Press, 1992, pp. 587-592.

Newman, William. "Document DNA: Camera Image Processing." 4pp.

NSG America, Inc. "SELFOC Lens Arrays for Line Scanning Applications." *Intelligent Opto Sensor Designer's Notebook*, No. 2, 5 pp.

ONClick Corporation. "VIA Mouse VIA-251." Brochure, 2pp.

Pal, U. S. Sinha, and B.B. Chaudhuri. "Multi-Oriented Text Lines Detection and Their Skew Estimation." Indian Conference on Computer Vision, Graphics, and Image Processing, Ahmedabad, India, Dec. 16-18, 2002, 6pp.

Peacocks MD&B. "Peacocks MD&B, Releases Latest hands and Eyes Free Voice Recognition Barcode Scanner." http://www.peacocks.com.au/store/page.pl?id=457, Dec. 5, 2004, 2pp.

Peterson, James L. "Detecting and Correcting Spelling Errors." *Communications of the ACM*, vol. 23 No. 12, Dec. 1980, pp. 676-687.

Planon Systems Solutions. "Docupen 700." www.docupen.com, accesssed Oct. 3, 2005.

Podio, Fernando L. "Biometrics—Technologies for Highly Secure Personal Authentication," National Institute of Standards and Technology, http://whitepapers.zdnet.com/search.aspx?compid=3968, May 2001, 8pp.

Precise Biometrics. "Precise 200 MC." http://www.precisebiometrics.com/data/content/DOCUMENTS/200592691619553200%20MC.pdf. accessed Oct. 4, 2005, 2pp.

Price, Morgan N, Gene Golovchinsky, Bill N. Schilit. "Linking by Inking: Trailblazing in a Paper-like Hypertext." *Proceedings of Hypertext '98*. Pittsburgh, PA: ACM Press, 1998, 10 pp.

Psion Teklogix. "WORKABOUT PRO." http://www.psionteklogix.com/public.aspx?s=uk&p=Products&pCat=128&pID=1058, accessed Oct. 3, 2005, 2pp.

Rao, Ramana, Stuart K. Card, Walter Johnson, Leigh Klotz, and Randall H. Trigg. "Protofoil: Storing and Finding the Information Worker's Paper Documents in an Electronic File Cabinet." *Proceedings of the ACM SIGCHI Conference on Human Factors in Computing Systems*. New York, NY: ACM Press, 1994, pp. 180-185, 477.

Roberts, David A. and Richard R.A. Syms. "1D and 2D Laser Line Scan Generation Using a Fibre Optic Resonant Scanner." Department of Electronic and Electrical Engineering, Imperial College of Science Technology and Medicine, 2003, 11pp.

Rus, Daniela, and Devika Subramanian. "Multi-media RISSC Informatics: Retrieving Information with Simple Structural Components." *Proceedings of the Second International Conference on Information and Knowledge Management*. New York, NY: 1993, pp. 283-294.

Samet, Hanan. "Data Structures for Quadtree Approximation and Compression." *Communications of the ACM*, vol. 28, No. 9, Sep. 1985: pp. 973-993.

Sanderson, Mark and C.J. Van Rijsbergen. "The Impact on Retrieval Effectiveness of Skewed Frequency Distributions." *ACM Transactions on Information Systems*, vol. 17, No. 4, Oct. 1999: pp. 440-465.

Schilit, Bill N. Gene Golovchinsky, Morgan N. Price. "Beyond Paper: Supporting Active Reading with Free Form Digital Ink Annotations." *Proceedings of CHI 98*. new York, NY: ACM Press, 1998, 8 pp.

Schott North America, "Clad Rod/ Image Conduit" Nov. 2004, 1 page.

Selberg, Erik, and Oren Etzioni. "On the Instability of Web Search Engines." In the Proceedings of RIAO, Paris, Apr. 2000, 14pp.

Smithwick, Quinn Y. J., Juris Vagners, Per G. Reinhall, Eric J. Seibel. "54.3: Modeling and Control of the Resonant Fiber Scanner for Laser Scanning Display or Acquisition." *SID Symposium Digest of Technical Papers*, vol. 34, Issue 1, May 2003: 1455-1457.

Sonka, Milan, Vaclav Hlavac, and Roger Boyle, *Image Processing, Analysis, and Machine Vision: (Second Edition)*. International Thomson Pubishing, 1998. Contents, Index, Preface, 37 pp.

Sony. "Sony Puppy Fingerprint Identity Products." http://bssc.sel.sony.com/Professional/puppy/, 2002, 1 p.

Spitz, A. Lawrence. "Progress in Document Reconstruction." Document Recognition Technologies, Inc. 16th Internaional Conference on Pattern Recognition (ICPR '02), 2002, 4pp.

Spitz, A. Lawrence. "Shape-based Word Recognition." *International Journal on Document Analysis and Recognition*, Oct. 20, 1998, 13 pp.

Srihari, Sargur N., Jonathan J. Hull, and Ramesh Choudhari. "Integrating Diverse Knowledge Sources in Text Recognition." *ACM Transactions in Office Information Systems*. vol. 1, No. 1, Jan. 1983, pp. 68-87.

Stevens, Jacob, Andrew Gee, and Chris Dance. "Automatic Processing of Document Annotations." Xerox Research Centre Europe. http://www.bmva.ac.uk/bmvc/1998/pdf/p062.pdf, 1998, 11 pp.

Su, Guo-Dung J., Shi-Sheng Lee, and Ming C. Wu. "Optical Scanners Realized by Surface-Micromachined Vertical Torsion Mirror" *IEEE Photonics Technology Letters*, vol. 11, No. 5, May 1999, 3pp.

Syscan Imaging. "Travelscan 464." http://www.syscaninc.com/prod_ts_464.html, accessed Oct. 3, 2005, 2pp.

Taghva, Kazem, Julie Borsack, and Allen Condit. "Results of Applying Probabilistic IR to OCR Text." *Proceedings of the 17th Annual International ACM-SIGIR Conferences on Research and Developement in Information Retrieval*. New York, NY: Springer-Verlag New York, 1994, pp. 202-211.

Tan, Chew Lim, Sam Yuan Sung, Zhauhui Yum and Yi Xu. "Text Retrieval from Document Images Based on N-Gram Algorithm." PRICAI Workshop on Text and Web Mining, 2000. 2 pp.

Trusted Reviews. "Digital Pen Roundup." http://www.trustedreviews.com/article.aspx?art=183, Jan. 24, 2004. 5pp.

TYI Systems Ltd. "Bellus iPen." http://www.bellus.com.tw/pen_scanner.htm, accessed Oct. 3, 2005, 3pp.

Van Eijkelenborg, Martijn A. "Imaging with Microstructured Polymer Fibre." *Optics Express*, vol. 12, No. 2., Jan. 26, 2004, pp. 342-346.

Vervoort, Marco. "Emile 4.1.6 User Guide" University of Amsterdam, Jun. 12, 2003, 83 pp.

Vocollect. "Vocollect Voice for Handhelds." http://www.vocollect.com/offerings/voice_handhelds.php, accessed Oct. 3, 2005, 2pp.

Vossler, Charles M. and Neil M. Branston. "The Use of Context for Correcting Garbled English Text." Cornell Aeronautical Laboratory, Inc.. *Proceedings of the 1964 19th ACM National Conference*. NY, NY: ACM Press, 13 pp.

Wang, Jin, and Jack Jean. "Segmentation of Merged Characters by Neural Newtwork and Shortest-Path." *Proceedings of the 1993 ACM/SIGAPP Symposium on Applied Computing: States of the Art and Practice*. New York, NY: ACM Press, 1993, pp. 762-769.

Wang, Wei-Chih, Mark Fauver, Jou Nhut Ho, Eric J. Siebel, Per G. Reinhall. "Micromachined Optical Waveguide Cantilever as a Resonant Optical Scanner." *Sensors and Actuators A (Physical)*, 2002, pp. 165-175.

Wang, Yalin, Ihsin T. Phillips, and Robert M. Haralick. "A Study on the Document Zone Content Classification Problem." Proceedings of the 5th International Workshop on Document Analysis Systems. London: Springer-Verlag, 2002, 12pp.

WizCom Technologies Ltd. "QuickLink-Pen Elite." http://www.wizcomtech.corn/Wizcom/products/product_info.asp?fid=101, Accessed Oct. 3, 2005, 2pp.

WizCom Technologies. "SuperPen Professional Product Page." http://www.wizcomtech.com/Wizcom/products/product_info.asp?fid=88&cp=1, accessed Oct. 3, 2005, 2pp.

Xerox "Patented Technology Could Turn Camera Phone Into Portable Scanner." Press release Nov. 15, 2004. http://www.xerox.com/go/xrx/template/inv_rel_newsroom.jsp?Xcntry=USA&Xlang=en_US&app=Newsroom&ed_name=NR_2004Nov15_MobileDocument_Imaging_Software&format=article&view=newsrelease&metrics=notrack, 2pp.

Hull, Jonathan and Dar-Shyang Lee, Simultaneous Highlighting of Paper and Electronic Documents, © 2000 IEEE, pp. 401-404.

PCT International Search Report for International Application No. PCT/US05/11017, date of mailing Jul. 15, 2008, 2 pages.

PCT International Search Report for International Application No. PCT/US05/11089, date of mailing Jul. 8, 2008, 3 pages.

Non-Final Office Action for U.S. Appl. No. 11/098,038, Mail Date Apr. 3, 2008, 11 pages.

Non-Final Office Action for U.S. Appl. No. 11/097,828, Mail Date May 22, 2008, 38 pages.

Non-Final Office Action for U.S. Appl. No. 11/098,014, Mail Date Jun. 18, 2008, 37 pp.

Non-Final Office Action for U.S. Appl. No. 11/097,833, Mail Date Jun. 25, 2008, 58 pages.

Non-Final Office Action for U.S. Appl. No. 11/097,836, Mail Date May 13, 2008, 56 pages.

Non-Final Office Action for U.S. Appl. No. 11/110,353, Mail Date Jun. 11, 2008, 24 pages.

Final Office Action for U.S. Appl. No. 11/097,835, Mail Date Jun. 23, 2008, 26 pages.

Final Office Action for U.S. Appl. No. 11/098,043, Mail Date Apr. 17, 2008, 45 pages.

Press Release, "Abera Introduces Truly Portable & Wireless Color Scanners: Capture Images Anywhere in the World without Connection to PC," PR Newswire, Oct. 9, 2000, New York, http://proquest.umi.com/pqdweb?did=62278377&sid=5&Fmt=7&clientid=19649&RQT=RQT=309&VName=PQD, 3 pages.

European Search Report for EP Application No. 05731509 dated Apr. 23, 2009.

European Search Report for EP Application No. 05732913 dated Mar. 31, 2009.

European Search Report for EP Application No. 05733191 dated Apr. 23, 2009.

European Search Report for EP Application No. 05733819 dated Mar. 31, 2009.

European Search Report for EP Application No. 05733851 dated Sep. 2, 2009.

European Search Report for EP Application No. 05733915 dated Dec. 30, 2009.

European Search Report for EP Application No. 05734996 dated Mar. 23, 2009.

European Search Report for EP Application No. 05737714 dated Mar. 31, 2009.

European Search Report for EP Application No. 05734796 dated Apr. 22, 2009.

European Search Report for EP Application No. 05734947 dated Mar. 20, 2009.

European Search Report for EP Application No. 05742065 dated Mar. 23, 2009.

European Search Report for EP Application No. 05745611 dated Mar. 23, 2009.

European Search Report for EP Application No. 05746428 dated Mar. 24, 2009.

European Search Report for EP Application No. 05746830 dated Mar. 23, 2009.

European Search Report for EP Application No. 05753019 dated Mar. 31, 2009.

European Search Report for EP Application No. 05789280 dated Mar. 23, 2009.

European Search Report for EP Application No. 05812073 dated Mar. 23, 2009.

European Search Report for EP Application No. 07813283 dated Dec. 10, 2010.

Feldman, Susan, "The Answer Machine," The Magazine for Database Professional, 8(1):58 (Jan. 2000).

Computer Hope, "Creating a link wthout an underline in HTML:," as evidenced by Internet Achive Wayback Machine: http://web.archive.org/web/20010329222623/http://www.computerhope.com/iss-ues/ch000074.htm, Mar. 29, 2001.

International Search Report for PCT/EP2007/005038 dated Sep. 17, 2007.

International Search Report for PCT/EP2007/007824 dated May 25, 2009.

International Search Report for PCT/EP2007/008075 dated Oct. 10, 2008.

International Search Report for PCT/US2005/011012 dated Sep. 29, 2006.

International Search Report for PCT/US2005/011013 dated Oct. 19, 2007.

International Search Report for PCT/US2005/011014 dated May 16, 2007.

International Search Report for PCT/US2005/011015 dated Dec. 1, 2006.

International Search Report for PCT/US2005/011016 dated May 29, 2007.

International Search Report for PCT/US2005/011026 dated Jun. 11, 2007.

International Search Report for PCT/US2005/011042 dated Sep. 10, 2007.

International Search Report for PCT/US2005/011043 dated Sep. 20, 2007.

International Search Report for PCT/US2005/011084 dated Aug. 8, 2008.

International Search Report for PCT/US2005/011085 dated Sep. 14, 2006.

International Search Report for PCT/US2005/011088 dated Aug. 29, 2008.

International Search Report for PCT/US2005/011090 dated Sep. 27, 2006.

International Search Report for PCT/US2005/011533 dated Jun. 4, 2007.

International Search Report for PCT/US2005/011534 dated Nov. 9, 2006.

International Search Report for PCT/US2005/012510 dated Jan. 6, 2011.

International Search Report for PCT/US2005/013297 dated Aug. 14, 2007.

International Search Report for PCT/US2005/013586 dated Aug. 7, 2009.

International Search Report for PCT/US2005/017333 dated Jun. 4, 2007.

International Search Report for PCT/US2005/025732 dated Dec. 5, 2005.

International Search Report for PCT/US2005/029536 dated Apr. 19, 2007.

International Search Report for PCT/US2005/029537 dated Sep. 28, 2007.

International Search Report for PCT/US2005/029539 dated Sep. 29, 2008.

International Search Report for PCT/US2005/029680 dated Jul. 13, 2010.

International Search Report for PCT/US2005/030007 dated Mar. 11, 2008.

International Search Report for PCT/US2005/029534 dated May 15, 2007.

International Search Report for PCT/US2005/034319 dated Apr. 17, 2006.
International Search Report for PCT/US2005/034734 dated Apr. 4, 2006.
International Search Report for PCT/US2006/007108 dated Oct. 30, 2007.
International Search Report for PCT/US2006/018198 dated Sep. 25, 2007.
International Search Report for PCT/US2007/074214 dated Sep. 9, 2008.
International Search Report for PCT/US2010/000497 dated Sep. 27, 2010.
International Search Report for PCT/US2010/000498 dated Aug. 2, 2010.
International Search Report for PCT/US2010/000499 dated Aug. 31, 2010.
International Search Report for PCT/US2010/027254 dated Oct. 22, 2010.
International Search Report for PCT/US2010/027255 dated Nov. 16, 2010.
International Search Report for PCT/US2010/027256 dated Nov. 15, 2010.
International Search Report for PCT/US2010/028066 dated Oct. 26, 2010.
Non-Final Office Action for U.S. Appl. No. 11/004,637 dated Apr. 2, 2009.
Notice of Allowance for U.S. Appl. No. 11/004,637 dated Dec. 11, 2009.
Notice of Allowance for U.S. Appl. No. 11/096,704 dated Jun. 5, 2009.
Final Office Action for U.S. Appl. No. 11/097,089 dated Mar. 17, 2009.
Non-Final Office Action for U.S. Appl. No. 11/097,089 dated Dec. 23, 2009.
Final Office Action for U.S. Appl. No. 11/097,089 dated Sep. 23, 2010.
Non-Final Office Action for U.S. Appl. No. 11/097,089 dated Apr. 7, 2011.
Notice of Allowance for U.S. Appl. No. 11/097,103 dated May 14, 2009.
Notice of Allowance for U.S. Appl. No. 11/097,828 dated Feb. 5, 2010.
Final Office Action for U.S. Appl. No. 11/097,833 dated Jul. 7, 2009.
Notice of Allowance for U.S. Appl. No. 11/097,833 dated Jan. 10, 2011.
Final Office Action for U.S. Appl. No. 11/097,835 dated Dec. 29, 2009.
Notice of Allowance for U.S. Appl. No. 11/097,835 dated Sep. 1, 2010.
Non-Final Office Action for U.S. Appl. No. 11/097,836 dated Jul. 30, 2009.
Final Office Action for U.S. Appl. No. 11/097,836 dated May 13, 2010.
Non-Final Office Action for U.S. Appl. No. 11/097,961 dated Mar. 5, 2009.
Final Office Action for U.S. Appl. No. 11/097,961 dated Dec. 9, 2009.
Non-Final Office Action for U.S. Appl. No. 11/097,961 dated Jul. 9, 2010.
Notice of Allowance for U.S. Appl. No. 11/097,981 dated Jul. 31, 2009.
Non-Final Office Action for U.S. Appl. No. 11/098,014 dated Jun. 30, 2009.
Non-Final Office Action for U.S. Appl. No. 11/098,014 dated Nov. 3, 2010.
Final Office Action for U.S. Appl. No. 11/098,014 dated Mar. 26, 2010.
Notice of Allowance for U.S. Appl. No. 11/098,014 dated Mar. 16, 2011.
Notice of Allowance for U.S. Appl. No. 11/098,016 dated Apr. 22, 2008.
Notice of Allowance for U.S. Appl. No. 11/098,038 dated May 29, 2009.
Final Office Action for U.S. Appl. No. 11/098,043 dated Jul. 21, 2009.
Non-Final Office Action for U.S. Appl. No. 11/110,353 dated Sep. 15, 2009.
Notice of Allowance for U.S. Appl. No. 11/110,353 dated Dec. 2, 2009.
Notice of Allowance for U.S. Appl. No. 11/131,945 dated Oct. 30, 2009.
Non-Final Office Action for U.S. Appl. No. 11/185,908 dated Dec. 14, 2009.
Final Office Action for U.S. Appl. No. 11/185,908 dated Jun. 28, 2010.
Final Office Action for U.S. Appl. No. 11/208,408 dated May 11, 2009.
Non-Final Office Action for U.S. Appl. No. 11/208,408 dated Apr. 23, 2010.
Notice of Allowance for U.S. Appl. No. 11/208,458 dated Jun. 2, 2008.
Non-Final Office Action for U.S. Appl. No. 11/208,461 dated Sep. 29, 2009.
Non-Final Office Action for U.S. Appl. No. 11/208,461 dated Nov. 3, 2010.
Notice of Allowance for U.S. Appl. No. 11/208,461 dated Mar. 15, 2011.
Non-Final Office Action for U.S. Appl. No. 11/209,333 dated Apr. 29, 2010.
Notice of Allowance for U.S. Appl. No. 11/210,260 dated Jan. 13, 2010.
Non-Final Office Action for U.S. Appl. No. 11/236,330 dated Dec. 2, 2009.
Notice of Allowance for U.S. Appl. No. 11/236,330 dated Jun. 22, 2010.
Final Office Action for U.S. Appl. No. 11/236,440 dated Jul. 22, 2009.
Non-Final Office Action for U.S. Appl. No. 11/365,983 dated Jan. 26, 2010.
Final Office Action for U.S. Appl. No. 11/365,983 dated Sep. 14, 2010.
Non-Final Office Action for U.S. Appl. No. 11/547,835 dated Dec. 29, 2010.
Non-Final Office Action for U.S. Appl. No. 11/672,014 dated May 6, 2010.
Notice of Allowance for U.S. Appl. No. 11/672,014 dated Feb. 28, 2011.
Non-Final Office Action for U.S. Appl. No. 11/758,866 dated Jun. 14, 2010.
Non-Final Office Action for U.S. Appl. No. 11/972,562 dated Apr. 21, 2010.
Non-Final Office Action for U.S. Appl. No. 12/538,731 dated Jun. 28, 2010.
Notice of Allowance for U.S. Appl. No. 12/538,731 dated Oct. 18, 2010.
Non-Final Office Action for U.S. Appl. No. 12/541,891 dated Dec. 9, 2010.
Non-Final Office Action for U.S. Appl. No. 12/542,816 dated Jun. 18, 2010.
Notice of Allowance for U.S. Appl. No. 12/542,816 dated Jan. 3, 2011.
Non-Final Office Action for U.S. Appl. No. 12/721,456 dated Mar. 1, 2011.
Non-Final Office Action for U.S. Appl. No. 12/887,473 dated Feb. 4, 2011.
Non-Final Office Action for U.S. Appl. No. 12/889,321 dated Mar. 31, 2011.
Non-Final Office Action for U.S. Appl. No. 12/904,064 dated Mar. 30, 2011.
D.P. Curtain, "Image Sensors—Capturing the Photograph," 2006, available at http://www.shortcourses.com/how/sensors/sensors.htm, (last visited Sep. 4, 2006).
King et al., U.S. Appl. No. 11/432,731, filed May 11, 2006.
King et al., U.S. Appl. No. 11/933,204, filed Oct. 31, 2007.
King et al., U.S. Appl. No. 11/952,885, filed Dec. 7, 2007.
King et al., U.S. Appl. No. 12/517,352, filed Jun. 2, 2009.

King et al., U.S. Appl. No. 12/517,541, filed Jun. 3, 2009.
King et al., U.S. Appl. No. 12/723,614, filed Mar. 12, 2010.
King et al., U.S. Appl. No. 12/728,144, filed Mar. 19, 2010.
King et al., U.S. Appl. No. 12/831,213, filed Jul. 6, 2010.
King et al., U.S. Appl. No. 12/884,139, filed Sep. 6, 2010.
King et al., U.S. Appl. No. 12/894,059, filed Sep. 29, 2010.
King et al., U.S. Appl. No. 12/902,081, filed Oct. 11, 2010.
King et al., U.S. Appl. No. 12/904,064, filed Oct. 13, 2010.
King et al., U.S. Appl. No. 12/961,407, filed Dec. 6, 2010.
King et al., U.S. Appl. No. 12/964,662, filed Dec. 9, 2010.
King et al., U.S. Appl. No. 13/031,316, filed Feb. 21, 2011.
Casey et al., "An Autonomous Reading Machine," IEEE Transactions on Computers, vol. C-17, No. 5, pp. 492-503 May 1968.

* cited by examiner

ASSOCIATION OF A PORTABLE SCANNER WITH INPUT/OUTPUT AND STORAGE DEVICES

CROSS-REFERENCE TO RELATED APPLICATIONS

This application is a Continuation-In-Part of the following, each of which is hereby incorporated by reference in its entirety: U.S. patent application Ser. No. 11/004,637 filed on Dec. 3, 2004 now U.S. Pat. No. 7,707,039, U.S. patent application Ser. No. 11/097,961, filed Apr. 1, 2005 now abandoned, entitled METHODS AND SYSTEMS FOR INITIATING APPLICATION PROCESSES BY DATA CAPTURE FROM RENDERED DOCUMENTS, U.S. patent application Ser. No. 11/097,093, filed Apr. 1, 2005 now abandoned, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, filed Apr. 1, 2005 now U.S. Pat. No. 7,599,844, entitled CONTENT ACCESS WITH HANDHELD DOCUMENT DATA CAPTURE DEVICES, U.S. patent application Ser. No. 11/098,014, filed Apr. 1, 2005, entitled SEARCH ENGINES AND SYSTEMS WITH HANDHELD DOCUMENT DATA CAPTURE DEVICES, U.S. patent application Ser. No. 11/097,103, filed Apr. 1, 2005 now U.S. Pat. No. 7,596,269, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, filed Apr. 1, 2005 now abandoned, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, filed Apr. 1, 2005 now U.S. Pat. No. 7,606,741, entitled INFORMATION GATHERING SYSTEM AND METHOD, U.S. patent application Ser. No. 11/097,089, filed Apr. 1, 2005, entitled DOCUMENT ENHANCEMENT SYSTEM AND METHOD, U.S. patent application Ser. No. 11/097,835, filed Apr. 1, 2005 now U.S. Pat. No. 7,831,912, entitled PUBLISHING TECHNIQUES FOR ADDING VALUE TO A RENDERED DOCUMENT, U.S. patent application Ser. No. 11/098,016, filed Apr. 1, 2005 now U.S. Pat. No. 7,421,155, entitled ARCHIVE OF TEXT CAPTURES FROM RENDERED DOCUMENTS, U.S. patent application Ser. No. 11/097,828, filed Apr. 1, 2005 now U.S. Pat. No. 7,742,953, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, filed Apr. 1, 2005, entitled AGGREGATE ANALYSIS OF TEXT CAPTURES PERFORMED BY MULTIPLE USERS FROM RENDERED DOCUMENTS, U.S. patent application Ser. No. 11/097,836, filed Apr. 1, 2005 now abandoned, entitled ESTABLISHING AN INTERACTIVE ENVIRONMENT FOR RENDERED DOCUMENTS, U.S. patent application Ser. No. 11/098,042, filed Apr. 1, 2005 now U.S. Pat. No. 7,593,605, entitled DATA CAPTURE FROM RENDERED DOCUMENTS USING HANDHELD DEVICE, U.S. patent application Ser. No. 11/096,704, filed Apr. 1, 2005 now U.S. Pat. No. 7,599,580, entitled CAPTURING TEXT FROM RENDERED DOCUMENTS USING SUPPLEMENTAL INFORMATION, U.S. patent application Ser. No. 11/110,353, filed Apr. 19, 2005 now U.S. Pat. No. 7,702,624, entitled PROCESSING TECHNIQUES FOR VISUAL CAPTURE DATA FROM A RENDERED DOCUMENT, U.S. patent application Ser. No. 11/131,945, filed May 17, 2005 now U.S. Pat. No. 7,818,215, entitled PROCESSING TECHNIQUES FOR TEXT CAPTURE FROM A RENDERED DOCUMENT, U.S. patent application Ser. No. 11/185,908, filed Jul. 19, 2005 now abandoned, entitled AUTOMATIC MODIFICATION OF WEB PAGES, U.S. patent application Ser. No. 11/208,408, filed Aug. 18, 2005 now abandoned, entitled SCANNER HAVING CONNECTED AND UNCONNECTED OPERATIONAL BEHAVIORS, U.S. patent application Ser. No. 11/208,457, filed Aug. 18, 2005 now abandoned, entitled LOCATING ELECTRONIC INSTANCES OF DOCUMENTS BASED ON RENDERED INSTANCES, DOCUMENT FRAGMENT DIGEST GENERATION, AND DIGEST BASED DOCUMENT FRAGMENT DETERMINATION, U.S. patent application Ser. No. 11/208,458, filed Aug. 18, 2005 now U.S. Pat. No. 7,437,023, entitled METHODS, SYSTEMS AND COMPUTER PROGRAM PRODUCTS FOR DATA GATHERING IN A DIGITAL AND HARD COPY DOCUMENT ENVIRONMENT, U.S. patent application Ser. No. 11/208,461, filed Aug. 18, 2005, entitled APPLYING SCANNED INFORMATION TO IDENTIFY CONTENT, U.S. patent application Ser. No. 11/209,333, filed Aug. 23, 2005 now abandoned, entitled A PORTABLE SCANNING DEVICE, U.S. patent application Ser. No. 11/210,260, filed Aug. 23, 2005 now U.S. Pat. No. 7,706,611, entitled A METHOD AND SYSTEM FOR CHARACTER RECOGNITION, U.S. patent application Ser. No. 11/236,440, filed Sep. 27, 2005 now abandoned, entitled SECURE DATA GATHERING FROM RENDERED DOCUMENTS, U.S. patent application Ser. No. 11/236,330, filed Sep. 27, 2005 now U.S. Pat. No. 7,812,860, entitled HANDHELD DEVICE FOR CAPTURING TEXT FROM BOTH A DOCUMENT PRINTED ON PAPER AND A DOCUMENT DISPLAYED ON A DYNAMIC DISPLAY DEVICE, International Patent Application No. PCT/US05/11533, filed Apr. 1, 2005, entitled A SYSTEM AND METHOD FOR CHARACTER RECOGNITION, International Patent Application No. PCT/US05/13586, filed Apr. 6, 2005, entitled SCANNING APPARATUS AND RELATED TECHNIQUES, International Patent Application No. PCT/US05/12510, filed Apr. 12, 2005, entitled ADDING VALUE TO A RENDERED DOCUMENT.

This application claims priority to, and incorporates by reference in its entirety, the following U.S. Provisional Patent Application: Application No. 60/657,309 filed on Feb. 28, 2005.

This application incorporates by reference in their entirety, the following U.S. Provisional Patent Applications, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004; Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667 filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602, 930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005.

TECHNICAL FIELD

The present disclosure relates to scanners, and more particularly to content retrieval that results from scanning.

BACKGROUND

A proliferation of portable scanning devices enables many new applications involving the interaction of the printed and digital world. However, the portability of such devices necessarily involves compromises on the capabilities inherent therein.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art may obtain a full appreciation of aspects of the invention from the subsequent detailed description, read together with the figures, and from the claims (which follow the detailed description).

In some embodiments, a device identifier is scanned from a device and the device is identified as an associated device of the scanner. A service provider receives a request including scanned information, to associate the portable scanner with the device and identifies the device as an associated device of the portable scanner.

In some embodiments, a service provider receives a device identifier scanned using a portable scanner, and receives additional information scanned using the portable scanner. The service provider identifies a network address of a device identified by the device identifier, and sends content to the network address in response to receiving the additional information scanned using the portable scanner.

In some embodiments, the system associates nearby devices with the user's scanner such that the nearby devices may be used for user input/output (I/O) in response to scans of a printed document. The nearby I/O devices thus become part of the user interface (UI) for the portable scanner. An embodiment of the disclosed innovations may serve as an adaptive distributed user interface for a portable scanning device. Nearby displays, computers, cellphones, printers, public terminals, audio devices (speakers, microphones), etc, may be associated with the user's scanner to provide a flexible user interface that utilizes the I/O devices in its vicinity. Some embodiments of the disclosed innovations may apply nearby I/O devices to enable the delivery of many types of multimedia content (music, video, etc.) that would not normally be suitable for rendering by a small portable device.

In some embodiments, a web browser (or other session-oriented application capable of exchanging information via a network with a server application) is associated with a session ID code displayed on the screen of the device session-oriented application providing the application. The session-oriented application communicates a request for a session ID to the server. The session ID request is correlated with the network address of the device providing the application. The server communicates a unique session ID back to the device providing the application, and records the network address to which the session ID is sent (and with which, therefore, it is associated). The session ID code is scanned from the display of the device using a portable scanner and communicated by the scanner (via its currently active communication channel) to the server, requesting the server to communicate content related to subsequent scans of information to the network address associated with the session ID. Subsequent actions of the portable scanner result in the server retrieving the network address of the session-oriented application previously associated with the session ID and communicating content related to these subsequent actions to the associated network address, where the content is displayed, played, or otherwise rendered (e.g., on a display of the device providing the application).

In some embodiments, information is received about a physical location of a portable scanner. A device near the portable scanner is identified, and the device is identified as an output device for information resulting from actions of the portable scanner. For example, a device is identified from a database of devices previously registered with the server and known to be associated with the owner of the scanner.

In some embodiments, a nearby display is associated with a portable scanner for purposes of delivering information to the user of the portable scanner. To create the association, the user scans a code on the display with the portable scanner. The code may be shown on the display screen or a physical tag, such as a sticker with a barcode. This code and a user identifier are sent to a service provider where the association is recorded in address translation tables or databases. Subsequent information intended for the user is sent to the display until the association is terminated.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
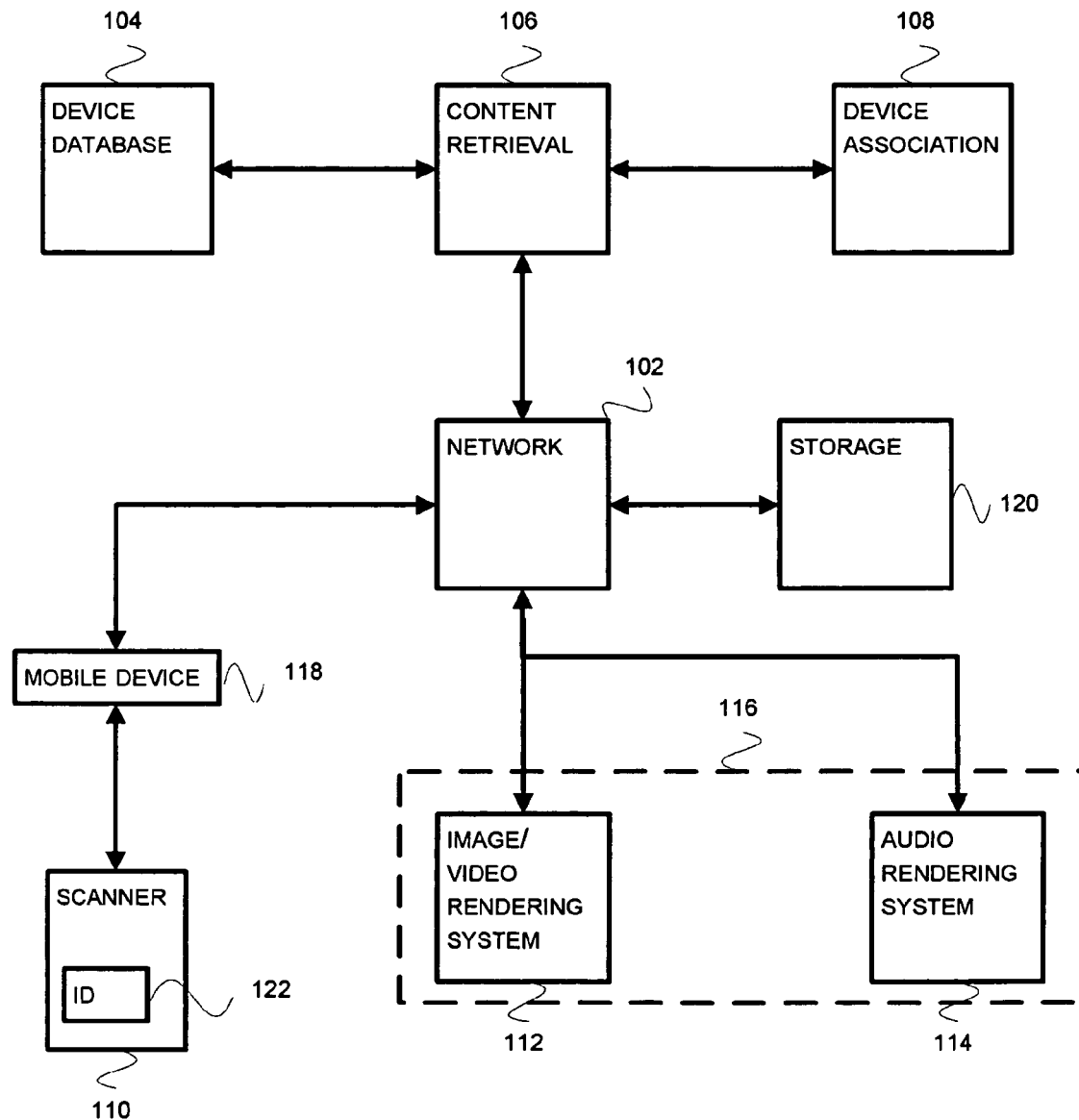
FIG. 1 is a block diagram of an embodiment of a system to associate a scanning device with one or more other devices.

FIG. 1 is a block diagram of an embodiment of a system to associate a scanning device with one or more other devices.

A mobile device 118 may incorporate or interact with a portable scanner function 110. The portable scanner 110, which is a scanner designed for convenient transport by a person, may be a pen-style device, a mouse, a remote control, or a portable phone, to name just a few of the possibilities. The portable scanner 110 may comprise short-range communication capability (e.g., short range RF such as Bluetooth™, short range wire-line such as USB, etc.) which it may use to communicate with the mobile device 118. The scanner includes a user ID code 122 that uniquely identifies the scanner among other such scanners known to the system.

Examples of mobile devices 118 include laptop, notebook, or sub-notebook computers; a hand-held computer such as a personal digital assistant (PDA); or a cellular or other wireless telephone.

Information captured by the portable scanner 110 in one or more scans, possibly along with other information, is communicated to the network 102, from which it is communicated to the content location and retrieval service 106. In some embodiments, this information may initiate a content request/location/retrieval action. The information from at least one of the scans may come from a printed source, for example, a newspaper, magazine, flyer, book, manual, brochure, label, or advertisement. The information from one or more of the scans may also come from electronically or digitally displayed information, for example, text, barcodes, icons, glyphs, or other information from an electronic display.

The mobile device 118 provides longer-range communication capability to the network 102. Examples of such communication comprise the standard public switched telephone network (using a dial-up modem, for example), digital subscriber line, asynchronous digital subscriber line, cable modem, Ethernet, wide-area LAN technology, wireless LAN technology such as IEEE 802.11, and wireless cell phone technology.

The network 102 comprises communication switching, routing, and data storage capabilities. The network 102, inter alia, routes and propagates information between components of the system. The network 102 may comprise the Internet, an intranet or intranets, wire-line and/or wireless network portions.

The device database 104 comprises information about devices that may be associated with the portable scanner 110, and, in some embodiments and/or under some conditions, the mobile device 118. In some embodiments, the device database 104 provides an association of device identifiers with device addresses. The device database 104 may also provide an association of device identifiers with supported content types. Some embodiments of the device database 104 comprise one or more of a relational database, an index, a mapping table, and an enhanced domain name service.

The device association 108 comprises associations between portable scanners and input/output (I/O), storage, or processing devices. In some embodiments the device database 104 and the device association 108 are distinct functions which may be separately accessed by other functions, for example, by content retrieval 106. In some embodiments the device association 108 and the device database 104 may be incorporated into a common functional component.

The content retrieval 106 communicates with the device database 104 and the device association 108 to obtain, inter alia, device information and device association information. In some embodiments the device database 104 and/or the device association 108 may communicate with the content retrieval 106 using a network such as network 102.

The device database 104, the device association 108, and the content retrieval 106 may comprise a "service provider." A service provider is a network-accessible provider of information and/or services in fulfillment of client requests. Service providers may provide subscription-based, advertising supported, pay-per-use, and/or pay-per-transaction access to content and/or communication services.

The content retrieval 106 comprises content location and retrieval functionality. Content is at least one of text, digital sound or music, or one or more digital images or video. The content retrieval 106 locates content corresponding to, related to, and/or identified by information scanned by the portable scanner 110.

The content retrieval 106 communicates with the network 102 and provides the located content to an I/O, storage, or processing device associated with the portable scanner 110.

The associated device may be, inter alia, an image/video rendering system 112 or audio rendering system 114. Some devices (e.g., a combined device 116) may include both audio and imaging/video systems 112 114. Examples of such combination devices 116 include a laptop computer, a desktop computer, televisions, multi-user computer systems, or a kiosk.

Other devices that may be associated with the portable scanner 110 include a data storage device 120 or a printer. Examples of a data storage device 120 comprise a computer hard drive, portable flash storage device, portable music and/or video and/or e-book player (e.g., portable content player), and optical storage media. Computing resources, such as a laptop, desktop, or network-based computer or computers, may also be associated with the portable scanner 110 in order to enhance the processing capabilities associated with the scanner 110.

Identifying a device to which content will be delivered may involve receiving a device identifier for the associated device. The device identifier may be provided by the scanner 110 or mobile device 118 associated with the scanner. Examples of a device identifier are a barcode, unique device serial number, a network address such as an Internet Protocol (IP) address, an alphanumeric code, or a unique device name.

In some embodiments, the network address of the associated device is necessary but an identifier for the associated device is not. The system may function without full knowledge of the capabilities of the associated device in some cases. In other cases, the capabilities may be inferred. For example, if the device requests a communication session identifier via a web browser, and a scanner subsequently submits the communication session identifier to the system, it is likely that the device has a display from which the session identifier was scanned.

In some embodiments, one or more devices are "registered" by the user of a scanner so that they are associated with the unique user (or device) ID that identifies the scanner. For example, a laptop computer that is owned by a user of a scanner may be registered as "Device #1" associated with the scanner's unique user and/or device ID (thus the associated device identifier may be quite simple given the limited number of devices registered by a single user). The associated device may comprise logic that automatically registers its current network address with the service provider (since that network address may frequently change when, for example, a laptop is moved to a new location and establishes a new connection with the Internet). This simplifies the user's task when initiating a new session with the service provider, because the user need only scan the associated device's identifier and automatically communicate a command to the service provider to look up the associated device, retrieve its current network address, and communicate subsequent system responses to the indicated device. Furthermore, the management of the service provider's system is simplified because there is no need to create and maintain a set of identifiers that are unique among all devices known to the service provider. Each user of the service may simply register any devices that are to be used without having to apply for (and subsequently apply) a more-complex device identifier, such as a lengthy serial number.

Furthermore, selecting a device from the small domain of devices associated with a given scanner (and/or user) makes it possible to use alternative methods to identify the desired device. For example, a device may be identified by scanning a selected icon or by performing a distinct gesture with the scanner.

A device identifier may be provided by scanning it and then communicating it to the content location and retrieval 106 (service provider) system. In some embodiments, a device identifier may be made to appear on a visual display of the device so that it may be scanned by the portable scanner 110. The device identifier may be scanned from a serial number affixed to the device, scanned from a barcode affixed to the device, and so on. The identifier of the associated device may be provided with or prior to a content request/location/retrieval action by the scanner 110.

In some embodiments, one or more of the devices that will be associated with a portable scanner 110 will be selected, at least in part, because they are nearby the location of the portable scanner 110. Identifying the location of the portable scanner 110 may occur, at least in part, using GPS satellite location information, information triangulated using multiple RF transceivers, and/or location of Wi-Fi or other wireless access points used by or nearby to the portable scanner 110.

In some embodiments, one or more associated devices may be selected or not selected at least in part by examining characteristics of the located content type (for example, is it text, video, or audio) and determining whether a candidate nearby device supports rendering of that content type.

In some embodiments, the device identifier for the associated device is used, at least in part, to identify the network address of the associated device. The device identifier may be a unique ID that distinguishes the device from all other devices known to the system, or it may be an identifier that, in combination with the unique user and/or device ID 122 associated with the scanner 110, serves to uniquely identify the device to the system. The network address may comprise, among other possibilities, an IP address, a MAC address, a Uniform Resource Locator, or a device name or identifier which is recognized by the network 102 as being a particular device to which information may be sent.

Delivering the located content to the associated device may comprise configuring the associated device for exclusive use by a person using the portable scanner 110 for as long as the portable scanner 110 is associated with the device. Configuring the associated device for exclusive access by the person using the scanner 110 may be particularly important in public or semi-public environments.

The portable scanner 110 and/or associated mobile device 118 may be provided with access to information for which access is controlled by the associated I/O or storage device. Examples of such information are information to enable and/or facilitate functionality of the scanner 110, possibly including keyword definitions, document indexes, tables and parameters to facilitate OCR and/or voice recognition.

Figure 2:
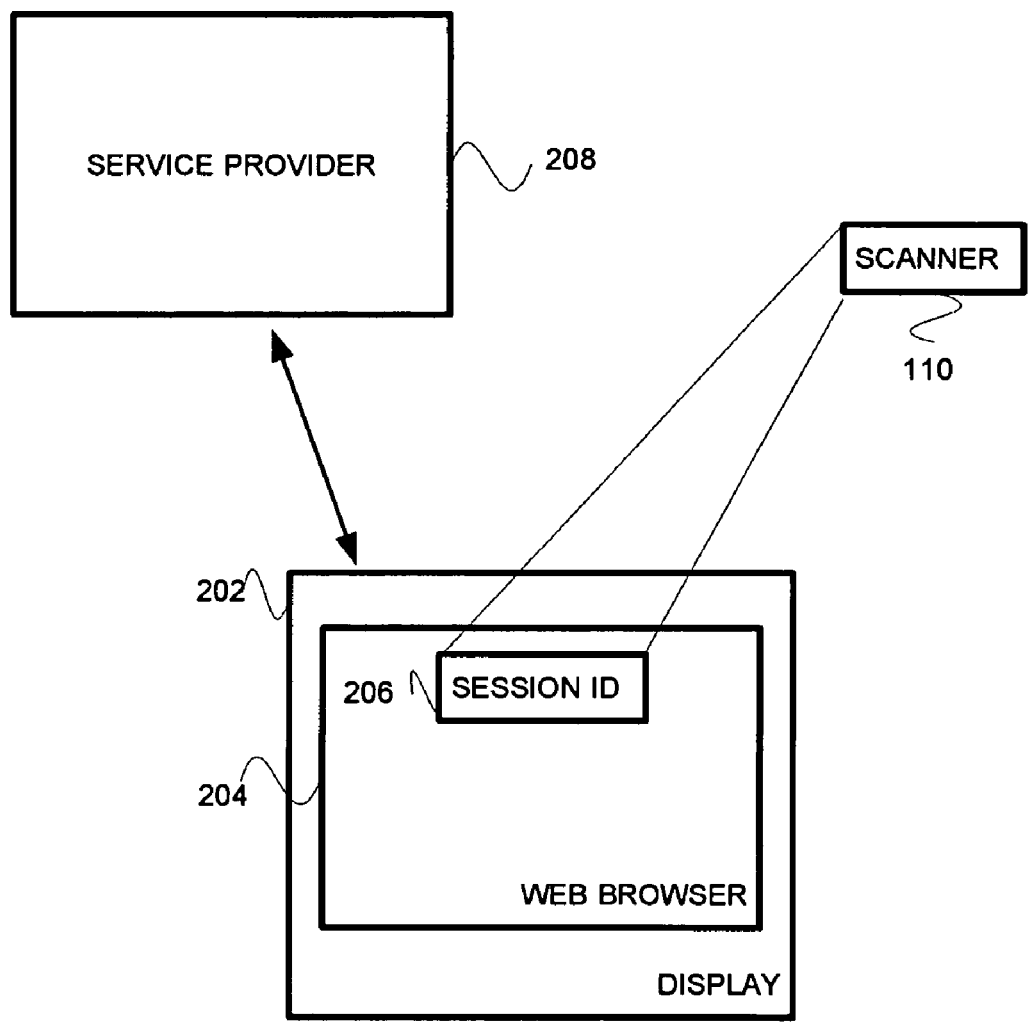
FIG. 2 is a block diagram of an embodiment of a system to associate a browsing session with a scanning device.

FIG. 2 is a block diagram of an embodiment of a system to associate a query session between a scanning device and a service provider. In this example, the session-oriented application comprises a web browser.

A portable scanner 110 interacts with and captures information from a computer system comprising a display 202. Examples of the computer system include a desktop, laptop, or handheld computer, a PDA, or a cellular or other wireless phone. The computer system comprises web browser 204 logic. The web browser 204 typically communicates via a network with a server. The server may comprise, inter alia, a web server, CGI script server, a private network (intranet) server, or a server of a wire-line or wireless telephone support network.

A web browsing session may be characterized by a session identifier (session ID 206). The session ID 206 is a code that uniquely identifies a browser communication session. Examples of session ids 206 are HTTP session IDs as well as other protocol session IDs. In some embodiments, when the web browser 204 is directed to load a web page from a URL designating a web site belonging to service provider 208, the service provider 208 records the network address associated with the request from the web browser 204, and returns a web page on which is displayed a unique session ID code 206. The service provider 208 records (for example, in device association database 108) the association between the unique session ID code 206 and the network address of the device providing the web browser 204 application.

The session identifier 206 may be displayed to a user of the browser 204. Specific functionality may be provided to the web browser 204 so that the session identifier 206 may be displayed. The portable scanner 110 may scan the displayed session ID 206 code. The scanner 110 communicates the scanned unique session ID code 206 to the service provider 208, together with the unique scanner and/or user ID 122, using any of the one or more network communication channels by which the scanner 110 communicates with the service provider 208. This may comprise a request to the service provider 208 to initiate a query session. Responses to subsequent scans (e.g., subsequent queries) are communicated to the web browser 204 at the network address previously associated with session ID 206. In some embodiments, the system may respond with a query session initiation request acknowledgement that may be displayed on web browser 204 confirming to the user that the system has correctly identified the user and his intention to initiate a query session via associated the device 202. When the user finishes a query session, for example, an "end session" icon or command may be scanned from the display of the associated device 202 and communicated to the service provider 208 to terminate the current session. The service provider 208 may then communicate a command to the web browser 204 to clear the display (removing any potentially sensitive information previously displayed in the session) and display a new unique session ID code 206 that may be scanned to initiate a new query session. Similarly, after a pre-determined time interval during which no communication is received by the service provider 208 from the scanner 110, the session may automatically time-out and be similarly terminated.

Subsequent to communicating a query session initiation request, the portable scanner 110 may scan information from a printed source. The scanned information may include text, a barcode, glyph, and/or other identifier of a printed source. The scanned information may include a product name, barcode, company name, logo, trademark, or other identifier of a product. The scanned information may include song name, artist name, anthology name, and/or other identifier of musical content. The scanned information may include an image name, caption, heading, and/or other identifier of image content, or a movie name, actor name, producer name, director name, studio name, product name, or other identifier of video content.

Information captured by the at least one scans (including the scanned session ID 206), with possibly additional information, may be incorporated in a content request. The scanned information may be communicated to a service provider 208 in one or more communications. The service provider 208 may apply the session ID code 206 to, at least in part, direct content back to the web browser 204. This may result in the web browser 204 receiving content communicated as a result of actions of the portable scanner 110.

Content communicated may include an electronic version of a printed document from which information was scanned, digital music associated with information of a scan, a digital voice recording, audio news or commentary, audio product information, or other recorded or synthesized sound, at least one of digital image, digital photo, product image or video, video of news reports or commentary, or other digital images or video.

Figure 3:
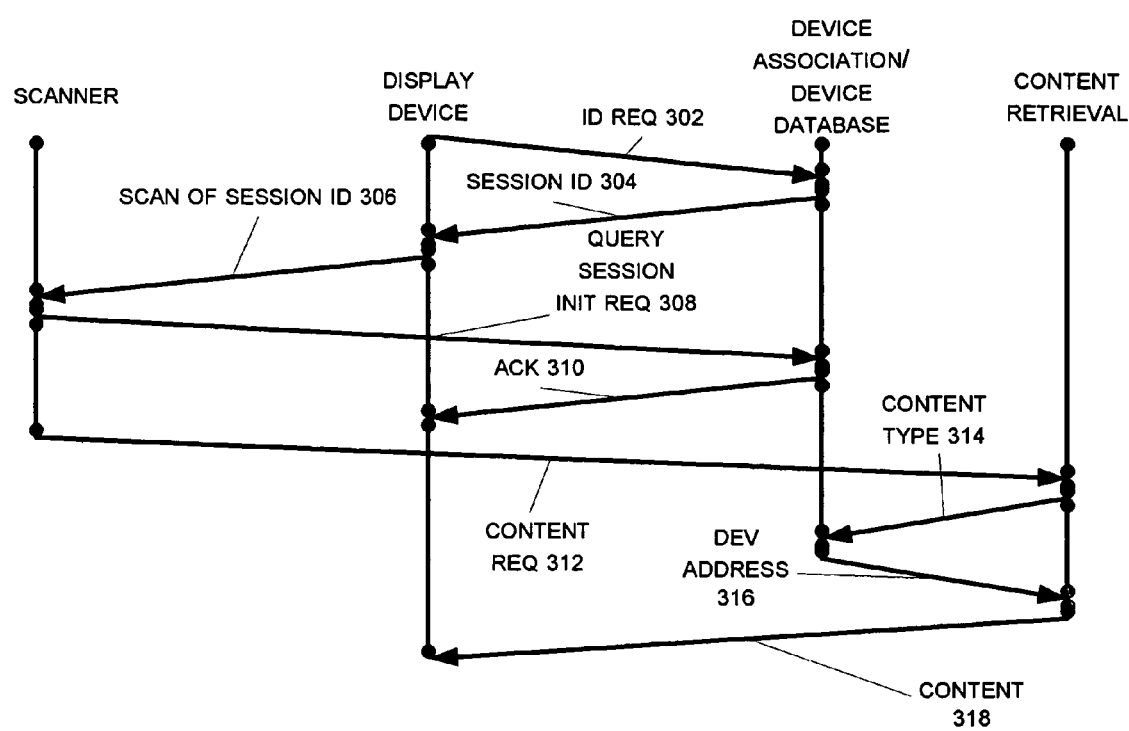
FIG. 3 is an action flow diagram of an embodiment of a process of providing content to a scanner-associated device.

FIG. 3 is an action flow diagram of an embodiment of a process of providing content to a scanner-associated device.

At 302 a display device comprising web browser logic communicates a request to the service provider (e.g., a system comprising the device association and/or device database) to generate a unique session ID code, which is recorded in the device association database along with a network address associated with the browser. At 304, a unique session ID is generated and communicated back to the browser at its associated network address. At 306, the unique session ID is scanned from its displayed location, and at 308 a query session initiation request is communicated to the service provider that includes both the unique user and/or scanner ID and the unique session ID code. The service provider applies the unique session ID code contained in the request 308 to identify the network address recorded in the device association database, and a query session acknowledgement is communicated at 310 to the device at the identified network address. The browser displays the query session request acknowledgement to the user of the scanner. The service provider also records, in the device association database, that the unique session ID is now "owned" by the user of the scanner, e.g., that other portable scanning devices may not become associated with this session ID. The service provider associates the unique user and/or scanner ID with the currently active session ID code and the associated network address.

At 312 the scanner communicates scanned information (REQ) to the content retrieval function. Content retrieval determines content to provide in response to the scanned information.

In some embodiments, the type of the content is communicated to the device database at 314. Content type may be used, at least in part, in determining which associated device or devices is most suited to render the content when more than one device is currently actively associated with scanner. When content is identified for which no currently available device is suitable, a link to such content or the content itself may be stored in a database, emailed to a predetermined address for the user, or otherwise retained, so that such content may be accessed at a later time when an appropriate rendering device is available.

At 316 the device database communicates an associated device address or addresses, or a network address or addresses, to content retrieval. At 318 content retrieval provides the content to the associated device.

In some embodiments, the system may associate storage devices with the user's scanner for the purpose of storing electronic content (audio, video, digital documents, etc.) delivered by the system in response to a scan of a printed document. For instance, by scanning an identifier that uniquely identifies a device having storage capability (such as a computer with a hard drive, writable DVD, CD-ROM, etc.), the system may modify its databases so that future deliveries of content in response to scans of printed documents (originating from the portable scanner) will be delivered to the corresponding storage device and archived for later retrieval.

In some embodiments, the system determines the user's location and which nearby devices may be associated with the user's portable electronic device. The system may determine the user's location by way of on-board GPS in portable device, by triangulation of wireless signals, by determining the location of the communication network transceiver serving the device, by querying the user, or any other suitable method.

In some embodiments, the system maintains a device database that has location information for I/O devices that may be used in conjunction with a portable scanning device. When the system receives a request from a portable scanner for association with an I/O device, the system determines the location of the portable scanner and then identifies appropriate candidates by referring to the device database.

In some embodiments, the user may preset the associations of devices with the portable scanner. As one example, the user may want to have his home computer designated as the recipient for content requests that originate from his scanner. To accomplish this, the user may access the service provider's website and manually enter identifiers of the devices and data repositories (e.g., the home computer) that are to receive responses to his scanned queries. Alternatively, the recipient devices may be automatically identified by the various scanning methods discussed throughout this document.

In some embodiments, a public kiosk displays a dynamic session ID. The kiosk is connected to a communication network such as the Internet or a corporate intranet. The connection may be via cable modem, telephone system (PSTN, ADSL, DSL, etc), wireless local area network (WLAN, IEEE802.11, etc.) or any other suitable access method. The session ID changes periodically but at least every time that the kiosk is used so that a new session ID is displayed to every new user. To use the kiosk, the user scans in the session ID displayed by the kiosk; by scanning the session ID, the user informs the system that he wishes to temporarily associate the kiosk with his scanner for the delivery of content resulting from scans of printed documents. The scanner may communicate the session ID and other information authenticating the scanner (such as a serial number, account number, or other identifying information) directly to the system (perhaps via a wireless communication such as a cellular Short Message Service (SMS) message) or by using the kiosk's links to the communication network. For example, the scanner may apply the kiosk's communication link by transferring the session initiation information to the kiosk (perhaps via short range RF such as BlueTooth™, etc.). The kiosk communicate then communicates the session initiation information to the service provider's system via its Internet connection. The scanner may communicate directly (where "directly" means without passing the message through the kiosk) with the service provider's system by communicating the session initiation message through the user's cellphone (which may be paired with the user's scanner via Bluetooth) or other wireless communication device.

In some embodiments, the system may prevent others from using a device associated with a scanner during the period (session) in which the device is associated with the scanner. This feature is especially useful to prevent others from using a public kiosk before a previous session has ended. As an example of this concept related to use of a computer at an internet café, the user may initiate the session by scanning the session ID from the kiosk display (or entering it via a keypad or touchscreen on the portable scanner); and the system associates in its databases the session ID with the serial number (or other identifier that uniquely identifies the user and/or the user's scanner) of his scanner so another scanner cannot scan the session ID and use the kiosk during his session. The scanner may be in communication (through wireless link such as Bluetooth™, a hardwired link such as a docking station, etc.) with a computer associated with the display or may be in direct (i.e., without going through the computer) communication with the service provider's system via another means such as cellular, etc.

In some embodiments, a portable scanner's functions may vary depending upon the associated devices. For example, if a portable scanner is associated with a nearby computer that has optical character recognition (OCR) capability, the scanner may communicate scanned image data to the computer, whereas if the associated computer did not have OCR capability, the portable scanner may apply an on-board OCR function to convert the scanned images to text before communicating the text to the service provider.

In some embodiments, the scanner may obtain the communication session identifier from the computer by wireless communications (e.g., a Bluetooth™ link) rather than scanning. For example, after a portable scanner makes a Bluetooth™ connection with a computer, the computer may use the Bluetooth connection to communicate the communication session identifier to the scanner, rather than displaying it on the computer display for the user to scan with the portable scanner.

In some embodiments, the system enhances the user interface for portable electronic devices by associating other devices that have better video or audio capability than the portable electronic device. For example, a subscriber waiting for a flight in an airport may browse a television guide and notice a show that he wishes to watch. Using the web browser on his computer to browse to the service provider's website, the subscriber may get a communication session identifier communicated to his laptop computer. Scanning the communication session identifier and information identifying the show from the television guide, the subscriber identifies the laptop computer as the location where he wishes to have the video content (the television show) delivered. The system may check whether the subscriber has the proper permissions to access the content (e.g., does he have a 'cable television' service contract; if broadband Internet access is necessary to deliver the video, does he have a broadband service contract with an Internet Service Provider, etc.) prior to sending it to the laptop computer.

Those having skill in the art will appreciate that there are various vehicles by which processes and/or systems described herein can be effected (e.g., hardware, software, and/or firmware, collectively, logic), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein, may be implemented via forms of logic including Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented using forms of logic including integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by logic including a wide range of hardware, software, firmware, or any combination thereof which can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. Although many of the embodiments have been described in the context of a portable scanner, one of ordinary skill in the art understands that any portable electronic device having imaging capability may be suitable to implement the disclosed innovations.

We claim:

1. A method comprising:
  a computing system receiving an identification request from a displaying device, wherein the identification request specifies an address of the displaying device;
  in response to receiving the identification request, the computing system transmitting a session identifier to the displaying device;
  the computing system receiving a session initiation request from a scanning device, wherein the session initiation request contains the session identifier and a scanning device identifier, wherein the scanning device identifier is unique to the scanning device, and wherein the scanning device and the displaying device each communicate independently with the computing system;
  in response to receiving the session initiation request, the computing system creating an association between the session identifier, the scanning device identifier, and the address of the displaying device;
  the computing system receiving a digital media request from the scanning device, wherein the digital media request contains information scanned by the scanning device that identifies requested digital media; and
  based on the information scanned by the scanning device and the association between the session identifier, the scanning device identifier, and the address of the displaying device, the computing system transmitting the requested digital media to the displaying device.

2. The method of claim 1, wherein the association between the session identifier, the scanning device identifier, and the address of the displaying device is stored in a database device, and wherein the digital media is stored in a content device that is physically separate from the database device.

3. The method of claim 1, further comprising:
  before transmitting the digital media to the displaying device, and based on the association between the session identifier, the scanning device identifier, and the address of the displaying device, the computing system determining that the displaying device is suitable for displaying the digital media.

4. The method of claim 1, wherein the computing system transmits the digital media to the displaying device also based on a physical location of the scanning device.

5. The method of claim 1, further comprising:
  after system storing the association between the session identifier, the scanning device identifier, and the address of the displaying device, the computing system recording that the session identifier is owned by the scanning device and that other scanning devices may not become associated with this session identifier.

6. The method of claim 1, wherein the scanning device is a mobile telephone device equipped with an image-capturing component.

7. The method of claim 1, further comprising: in response to receiving the digital media request from the scanning device, the computing system determining the address of the displaying device from the association.

8. The method of claim 1, wherein the information scanned by the scanning device is in print form and encodes a reference to the digital media.

9. An article of manufacture including a non-transitory computer-readable medium, having stored thereon program instructions that, if executed by a computing device, cause the computing device to perform operations comprising:
receive an identification request from a displaying device, wherein the identification request specifies an address of the displaying device;
in response to receiving the identification request, transmit a session identifier to the displaying device;
receive a session initiation request from a scanning device, wherein the session initiation request contains the session identifier and a scanning device identifier, wherein the scanning device identifier is unique to the scanning device, and wherein the scanning device and the displaying device each communicate independently with the computing system;
in response to receiving the session initiation request, create an association between the session identifier, the scanning device identifier, and the address of the displaying device;
receive a digital media request from the scanning device, wherein the digital media request contains information scanned by the scanning device that identifies requested digital media; and
based on the information scanned by the scanning device and the association between the session identifier, the scanning device identifier, and the address of the displaying device, transmit the requested digital media to the displaying device.

10. The article of manufacture of claim 9, wherein the association between the session identifier, the scanning device identifier, and the address of the displaying device is stored in a database device, and wherein the digital media is stored in a content device that is physically separate from the database device.

11. The article of manufacture of claim 9, wherein the program instructions, if executed by the computing device, cause the computing device to perform operations further comprising:
before transmitting the digital media to the displaying device, and based on the association between the session identifier, the scanning device identifier, and the address of the displaying device, determine that the displaying device is suitable for displaying the digital media.

12. The article of manufacture of claim 9, wherein transmitting the digital media to the displaying device is also based on a physical location of the scanning device.

13. The article of manufacture of claim 9, wherein the program instructions, if executed by the computing device, cause the computing device to perform operations further comprising:
after system storing the association between the session identifier, the scanning device identifier, and the address of the displaying device, record that the session identifier is owned by the scanning device and that other scanning devices may not become associated with this session identifier.

14. The article of manufacture of claim 9, wherein the scanning device is a mobile telephone device equipped with an image-capturing component.

15. The article of manufacture of claim 9, wherein the program instructions, if executed by the computing device, cause the computing device to perform operations further comprising:
in response to receiving the digital media request from the scanning device, determine the address of the displaying device from the association.

16. The article of manufacture of claim 9, wherein the information scanned by the scanning device is in print form and encodes a reference to the digital media.

17. A system comprising:
means for receiving an identification request from a displaying device, wherein the identification request specifies an address of the displaying device;
means for, in response to receiving the identification request, transmitting a session identifier to the displaying device;
means for receiving a session initiation request from a scanning device, wherein the session initiation request contains the session identifier and a scanning device identifier, wherein the scanning device identifier is unique to the scanning device, and wherein the scanning device and the displaying device each communicate independently with the computing system;
means for, in response to receiving the session initiation request, creating an association between the session identifier, the scanning device identifier, and the address of the displaying device;
means for receiving a digital media request from the scanning device, wherein the digital media request contains information scanned by the scanning device that identifies requested digital media; and
means for, based on the information scanned by the scanning device and the association between the session identifier, the scanning device identifier, and the address of the displaying device, transmitting the request digital media to the displaying device.

18. The system of claim 17, wherein the association between the session identifier, the scanning device identifier, and the address of the displaying device is stored in a database device, and wherein the digital media is stored in a content device that is physically separate from the database device.

19. The system of claim 17, further comprising:
means for, before transmitting the digital media to the displaying device, and based on the association between the session identifier, the scanning device identifier, and the address of the displaying device, determining that the displaying device is suitable for displaying the digital media.

20. The system of claim 17, wherein transmitting the digital media to the displaying device also based on a physical location of the scanning device.

21. The system of claim 17, further comprising:
means for, after system storing the association between the session identifier, the scanning device identifier, and the address of the displaying device, recording that the session identifier is owned by the scanning device and that other scanning devices may not become associated with this session identifier.

22. The system of claim 17, wherein the scanning device is a mobile telephone device equipped with an image-capturing component.

23. The system of claim 17, further comprising:
means for, in response to receiving the digital media request from the scanning device, determining the address of the displaying device from the association.

24. The system of claim 17, wherein the information scanned by the scanning device is in print form and encodes a reference to the digital media.

25. A computing system comprising:

a database device that (i) receives an identification request from a displaying device, wherein the identification request specifies an address of the displaying device, (ii) in response to receiving the identification request, transmits a session identifier to the displaying device, (iii) receives a session initiation request from a scanning device, wherein the session initiation request contains the session identifier and a scanning device identifier, wherein the scanning device identifier is unique to the scanning device, and wherein the scanning device and the displaying device each communicate independently with the computing system, and (iv) in response to receiving the session initiation request, the computing system creating an association between the session identifier, the scanning device identifier, and the address of the displaying device; and a content device that (i) receives a digital media request from the scanning device, wherein the digital media request contains information scanned by the scanning device that identifies requested digital media, and (ii) based on the information scanned by the scanning device and the association between the session identifier, the scanning device identifier, and the address of the displaying device, transmits the requested digital media to the displaying device.

26. The computing system of claim 25, wherein, before transmitting the digital media to the displaying device, and based on the association between the session identifier, the scanning device identifier, and the address of the displaying device, the content device determines that the displaying device is suitable for displaying the digital media.

27. The computing system of claim 25, wherein the content device transmits the digital media to the displaying device also based on a physical location of the scanning device.

28. The computing system of claim 25, wherein, after system storing the association between the session identifier, the scanning device identifier, and the address of the displaying device, the database device recording that the session identifier is owned by the scanning device and that other scanning devices may not become associated with this session identifier.

29. The computing system of claim 25, wherein the scanning device is a mobile telephone device equipped with an image-capturing component.

30. The computing system of claim 25, wherein, in response to receiving the digital media request from the scanning device, the content device determines the address of the displaying device from the association.

31. The computing system of claim 25, wherein the information scanned by the scanning device is in print form and encodes a reference to the digital media.

32. The computing system of claim 25, wherein the database device and the content device are comprised within the same physical component.

* * * * *